(12) United States Patent
Breton et al.

(10) Patent No.: US 8,791,202 B2
(45) Date of Patent: Jul. 29, 2014

(54) PHASE CHANGE INK COMPOSITIONS

(75) Inventors: Marcel P. Breton, Mississauga (CA); Caroline M. Turek, Hamilton (CA)

(73) Assignee: Xerox Corporation, Norwalk, CT (US)

( * ) Notice: Subject to any disclaimer, the term of this patent is extended or adjusted under 35 U.S.C. 154(b) by 1370 days.

(21) Appl. No.: 12/148,651

(22) Filed: Apr. 21, 2008

(65) Prior Publication Data

US 2009/0082489 A1 Mar. 26, 2009

Related U.S. Application Data

(60) Provisional application No. 60/994,795, filed on Sep. 21, 2007.

(51) Int. Cl.
*C09D 11/02* (2014.01)
*C09D 11/10* (2014.01)
*C08K 9/04* (2006.01)

(52) U.S. Cl.
USPC .... 524/602; 106/31.13; 106/31.6; 106/31.61; 523/200

(58) Field of Classification Search
CPC .... C09D 11/34; C09D 11/106; C09D 11/108; C08K 7/02; C08K 2201/016
USPC ............... 524/602; 106/31.13, 31.61, 31.6; 523/200
See application file for complete search history.

(56) References Cited

U.S. PATENT DOCUMENTS

| | | | |
|---|---|---|---|
| 4,830,671 A | 5/1989 | Frihart et al. | 106/31.29 |
| 4,889,560 A | 12/1989 | Jaeger et al. | 106/31.29 |
| 4,889,761 A | 12/1989 | Titterington et al. | 428/32.1 |
| 5,194,638 A | 3/1993 | Frihart et al. | 554/47 |
| 5,195,430 A | 3/1993 | Rise | 100/168 |
| 5,221,335 A | 6/1993 | Williams et al. | 524/560 |
| 5,231,135 A | 7/1993 | Machell et al. | 525/123 |
| 5,372,852 A | 12/1994 | Titterington et al. | 427/288 |
| 5,389,958 A | 2/1995 | Bui et al. | 347/103 |
| 5,496,879 A | 3/1996 | Griebel et al. | 524/320 |
| 5,597,856 A | 1/1997 | Yu et al. | 524/227 |
| 5,621,022 A | 4/1997 | Jaeger et al. | 523/161 |
| 5,750,604 A | 5/1998 | Banning et al. | 524/187 |
| 5,780,528 A | 7/1998 | Titterington et al. | 523/161 |
| 5,782,966 A | 7/1998 | Bui et al. | 106/31.43 |
| 5,783,658 A | 7/1998 | Banning et al. | 524/590 |
| 5,827,918 A | 10/1998 | Titterington et al. | 524/590 |
| 5,830,942 A | 11/1998 | King et al. | 524/590 |
| 5,919,839 A | 7/1999 | Titterington et al. | 523/161 |
| 5,935,883 A | 8/1999 | Pike | 442/340 |
| 6,174,937 B1 | 1/2001 | Banning et al. | 523/160 |
| 6,221,137 B1 | 4/2001 | King et al. | 106/31.29 |
| 6,255,432 B1 | 7/2001 | Evans et al. | 528/49 |
| 6,309,453 B1 | 10/2001 | Banning et al. | 106/31.29 |
| 6,471,758 B1 * | 10/2002 | Kelderman et al. | 106/31.29 |
| 6,472,523 B1 | 10/2002 | Banning et al. | 540/128 |
| 6,476,219 B1 | 11/2002 | Duff et al. | 540/128 |
| 6,576,747 B1 | 6/2003 | Carlini et al. | 534/649 |
| 6,576,748 B1 | 6/2003 | Carlini et al. | 534/649 |
| 6,590,082 B1 | 7/2003 | Banning et al. | 534/649 |
| 6,646,111 B1 | 11/2003 | Carlini et al. | 534/649 |
| 6,663,703 B1 | 12/2003 | Wu et al. | 106/31.29 |
| 6,673,139 B1 | 1/2004 | Wu et al. | 106/31.29 |
| 6,696,552 B2 | 2/2004 | Mayo et al. | 534/649 |
| 6,713,614 B2 | 3/2004 | Carlini et al. | 534/649 |
| 6,726,755 B2 | 4/2004 | Titterington et al. | 106/31.29 |
| 6,755,902 B2 | 6/2004 | Banning et al. | 106/31.29 |
| 6,858,070 B1 | 2/2005 | Wong et al. | 106/31.61 |
| 6,860,930 B2 | 3/2005 | Wu et al. | 106/31.29 |
| 6,958,406 B2 | 10/2005 | Banning et al. | 552/243 |
| 6,989,052 B1 | 1/2006 | Wu et al. | 106/31.29 |
| 7,053,227 B2 | 5/2006 | Jaeger et al. | 552/247 |
| 7,259,275 B2 | 8/2007 | Belelie et al. | 560/169 |
| 7,271,284 B2 | 9/2007 | Toma et al. | 560/169 |
| 7,276,614 B2 | 10/2007 | Toma et al. | 554/37 |
| 7,279,587 B2 | 10/2007 | Odell et al. | 554/37 |
| 2003/0040551 A1 * | 2/2003 | Yamaguchi et al. | 523/113 |
| 2003/0209057 A1 * | 11/2003 | Yadav et al. | 73/31.05 |
| 2004/0102540 A1 * | 5/2004 | Jaeger et al. | 523/160 |
| 2006/0159850 A1 | 7/2006 | Breton et al. | |
| 2006/0166114 A1 * | 7/2006 | Lee | 430/7 |
| 2007/0119340 A1 | 5/2007 | Breton et al. | |
| 2007/0120909 A1 | 5/2007 | Belelie et al. | |

(Continued)

FOREIGN PATENT DOCUMENTS

| | | |
|---|---|---|
| GB | 2 238 792 | 6/1991 |
| GB | 2 294 939 | 5/1996 |
| GB | 2 305 928 | 4/1997 |
| WO | WO 94/14902 | 7/1994 |
| WO | WO 95/04760 | 2/1995 |
| WO | WO 2006130144 A1 * | 12/2006 |

OTHER PUBLICATIONS

U.S. Patent Application filed Aug. 14, 2007, of Jennifer L. Belelie et al., entitled "Phase Change Ink Compositions" 59 pages, U.S. Appl. No. 11/893,072, not yet published.

U. S. Provisional Patent Application filed Sep. 21, 2007, of Marcel P. Breton et al., entitled "Phase Change Ink Compositions" 52 pages, U.S. Appl. No. 60/994,795.

(Continued)

*Primary Examiner* — Michael Pepitone
(74) *Attorney, Agent, or Firm* — Marylou J. Lavoie

(57) ABSTRACT

A phase change ink composition including (a) an ink vehicle; (b) a dispersing agent; (c) a colorant; and (d) organic fiber shaped nanowhiskers, inorganic fiber shaped nanowhiskers, or a combination of organic and inorganic fiber shaped nanowhiskers, wherein the organic fiber shaped nanowhiskers, the inorganic fiber shaped nanowhiskers, or a combination thereof, are encapsulated or functionalized to enhance compatibility with the ink vehicle; and wherein the colorant and the organic fiber shaped nanowhiskers, the inorganic fiber shaped nanowhiskers, or combination of organic and inorganic fiber shaped nanowhiskers are substantially resistant to aggregation and settling in the ink vehicle.

10 Claims, No Drawings

(56) References Cited

U.S. PATENT DOCUMENTS

| | | | |
|---|---|---|---|
| 2007/0120910 A1 | 5/2007 | Odell et al. | |
| 2007/0120916 A1 | 5/2007 | Wu et al. | |
| 2007/0120925 A1 | 5/2007 | Belelie et al. | |
| 2007/0123601 A1 | 5/2007 | Belelie et al. | |
| 2007/0123606 A1 | 5/2007 | Toma et al. | |
| 2007/0123641 A1 | 5/2007 | Belelie et al. | |
| 2007/0123642 A1 | 5/2007 | Banning et al. | |
| 2007/0123663 A1 | 5/2007 | Toma et al. | |
| 2007/0123722 A1 | 5/2007 | Toma et al. | |
| 2007/0123723 A1 | 5/2007 | Odell et al. | |
| 2007/0123724 A1 | 5/2007 | Belelie et al. | |
| 2007/0142492 A1 | 6/2007 | Odell et al. | |
| 2007/0211110 A1 | 9/2007 | Iftime et al. | |
| 2007/0283846 A1 | 12/2007 | Breton et al. | |
| 2008/0000384 A1 | 1/2008 | Belelie et al. | |

OTHER PUBLICATIONS

English Abstract for Chinese Patent No. 101070439.
English Abstract for German Patent Publication DE 4205636AL, Aug. 1993.
English Abstract for German Patent Publication DE 4205713AL, Mar. 1996.
Rigoberto C. Advincula, "Surface Initiated Polymerization from Nanoparticle Surfaces" J. of Dispersion Science and Technology, vol. 24, Nos. 3 & 4, pp. 343-161, 2003.
Simon Flink et al., "Functionalization of self-assembled monolayers on glass and oxidized silicon wafers by surface reactions" J. of Physical Organic Chemistry, 2001, vol. 14, pp. 407-415.
L. Jin et al., "Preparation of End-Tethered DNA Monolayers on Siliceous Surfaces Using Heterobifunctional Corss-Linkers" Langmuir 19, pp. 6968-6975 (2003).
Gül GÜLŞIN in Arslan et al., "Surface Modification of Glass Beads with an Aminosilane Monolayer" Turk. J. Chem, 2006, 30, pp. 203-210.
G. S. Caravajal et al., "Structural Characterization of (3-Aminopropyl)triethoxysilane-Modified Silicas by Silicon-29 and Carbon-13 Nuclear Magnetic Resonance" Anal. Chem. 60, pp. 1776-1786 (1988).
K.M.R. Kallury et al., "Effect of Surface Water and Base Catalysis on the Silanization of Silica by (Aminopropyl)alkoxysilanes Stuidied by X-ray Photoelectorn Spectroscopy and $^{13}$C Cross-Polarization/Magic Angle Spinning Nuclear Magnetic Resonance" Langmuir 10, pp. 492-499 (1994).
P. Trens and R. Denoyel, "Adsorption of (γ-Aminopropyl)triethoxysilane and Related Molecules at the Silica/Heptane Interface" Langmuir 12, pp. 2781-2784 (1996).
K. C. Vrancken et al., "Surface and Structural Properties of Silica Gel in the Modfication with γ-Aminopropyltriethoxysilane" J. Of Colloid and Interface Science, 174, pp. 86-91 (1995).
Keisuke Kageyama et al., "Extrusion Polymerization: Catalyzed Synthesis of Crystalline Linear Polyethylene Nanofibers Within a Mesoporous Silica" Science, vol. 285, pp. 2113-2115, Sep. 24, 1999.
Hiroaki Miyagawa et al., "Effect of clay and Alumina-Nanowhisker Reinforcements on the Mechanical Properties of Nanocomposites from Biobased Epoxy: A Comparative Study" Ind. Eng. Chem. Res. 2004, 43, pp. 7001-7009.
Junfeng Rong et al., "A Polyethylene Nanocomposite Prepared Via In-Situ Polymerization" Macromol. Rapid Commun. 2001, 22, pp. 329-334.
Elisa Passglia et al., "Chemical Reactions Affecting the Free-Radical Grafting of Diethyl Maleate Onto Ethylene Polymers", Gazzetta Chimica Italiana, 127, pp. 91-95, 1997.
Elisa Passglia et al., "Effect of functional groups of modified polyolefins on the structure and properties of their composites with lamellar silicates" Polymer International 54, pp. 1549-1556 (2005).
Hong-Bo Zhai, et al., Abstract "Preperation and Characterization of Functionl Polyethylene and Its Nanocomposites" Polymer Materials Science and Engineering 21, No. 4, Jul. 2005, pp. 252-255.
A. Simon et al., "Study of Two Grafting Methods for Obtaining a 3-Aminoporpyltriethoxysilane Monolayer on Silica Surface" Journal of Colloid and Interface Science 251, pp. 278-283 (2002).
Internet Press Release, ".5 Micron Fiber Now Possible with New Nano Technology from Hills Inc. and Celanex Next Generation PBT from Ticona Engineering Polymers" Jan. 3, 2008, URL: http://www.nanotech-now.com/news.cgi?story_id=27515, 3 pages.
Fan Zhang et al., Abstract "Synthesis of Polyethylene/Montmorillnite Nanocomposites by In-situ Intercalative Polymerization", URL: http://jjap.ipap.jp/lilnk?JJAP/44/658/, 2 pages.
"Dimer Acids" Kirk-Othmer Encyclopedia of Chemical Technology, Vo. 8, $4^{th}$ Ed. (1992), pp. 223-237.
D. Cunliffe, et al., "Bacterial Adhesion at Synthetic Surfaces" Applied and Environmental Microbiology, Nov. 199, pp. 4995-5002.
http://www.nanophase.com/products/details.aspx?productid=1, aluminum oxide, 1 page, Jan. 17, 2012.
http://www.nanophase.com/products/details.aspx?productid=3, antimony tin oxide, 1 page, Jan. 17, 2012.
http://www.nanophase.com/products/details.aspx?ProductId=7, zinc oxide, 1 page, Jan. 17, 2012.

\* cited by examiner

PHASE CHANGE INK COMPOSITIONS

RELATED APPLICATIONS

This application claims the benefit of U.S. Provisional Application Ser. No. 60/994,795, filed Sep. 21, 2007, which is hereby incorporated by reference herein in its entirety.

BACKGROUND

Disclosed herein are phase change ink compositions, phase change ink vehicles, and methods for making same. More specifically, disclosed herein are phase change ink vehicles including fiber shaped nanowhiskers which can be used in direct and indirect printing processes. In one embodiment, the phase change inks are of the low energy type. In embodiments, phase change ink compositions are disclosed comprising (a) an ink vehicle; (b) a dispersing agent; (c) a colorant; and (d) organic fiber shaped nanowhiskers, inorganic fiber shaped nanowhiskers, or a combination of organic and inorganic fiber shaped nanowhiskers; wherein the organic fiber shaped nanowhiskers, the inorganic fiber shaped nanowhiskers, or a combination thereof, are encapsulated or functionalized to enhance compatibility with the ink vehicle; and wherein the colorant and the organic fiber shaped nanowhiskers, the inorganic fiber shaped nanowhiskers, or combination of organic and inorganic fiber shaped nanowhiskers are substantially resistant to aggregation and settling in the ink vehicle.

Another embodiment is directed to a method which comprises (a) incorporating into an ink jet printing apparatus the above-described phase change ink composition (b) melting the ink; (c) causing droplets of the melted ink to be ejected in an imagewise pattern onto an intermediate transfer member; and (d) transferring the ink in the imagewise pattern from the intermediate transfer member to a final recording substrate.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change organic phase change carrier composition which is combined with a phase change ink compatible colorant. In a specific embodiment, a series of colored phase change inks can be formed by combining organic phase change carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (commercially available from C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking, industrial marking, and labeling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change organic phase change carrier compositions are known and are described in U.S. Pat. No. 6,989,052, the disclosure of which is totally incorporated herein by reference.

U.S. patent application Ser. No. 11/423,777, filed Jun. 13, 2006, entitled "Organic Phase Change Carriers Containing Nanoparticles, Phase Change Inks Including Same, and Methods for Making Same," Publication Number 20070283846, with the named inventors M. Breton, J. Belelie, P. Odell, R. Carlini, A. Goredema, B. Goodbrand and Nan-Xing Hu, the disclosure of which is totally incorporated herein by reference, discloses an organic phase change carrier and a method for forming same, and a phase change ink including same. The organic phase change carrier comprises a colloidal dispersion of nanoparticles exhibiting a substantially uniform distribution of said nanoparticles discretely distributed therewithin, at least one curable monomer; a phase change inducing component, and an initiator. The organic phase change carrier exhibits a substantially uniform distribution of the nanoparticles so that they are discretely distributed therewithin, and are substantially resistant to the aggregation of the nanoparticles distributed therewithin.

U.S. patent application Ser. No. 11/291,540, filed Nov. 30, 2005, entitled "Ink Carriers Containing Nanoparticles, Phase Change Inks Including Same and Methods for Making Same," Publication Number 20070119340, with the named inventors Marcel P. Breton, Adela Goredema, Christine E. Bedford, Christopher A. Wagner, Sandra Gardner, Nan-Xing Hu, and Bruce Goodbrand, the disclosure of which is totally incorporated herein by reference, discloses an ink carrier and a method for forming same, and a phase change ink including same. The ink carrier comprises a colloidal dispersion of at least one of silica nanoparticles and metal oxide particles. The ink carrier can also include a low melting wax, and a gelling agent. The ink carrier exhibits a substantially uniform distribution of the nanoparticles so that they are discretely distributed therewithin, and are substantially resistant to the aggregation of the nanoparticles distributed therewithin.

Many phase change inks currently being used in solid ink jet piezoelectric printers employ low molecular weight polyethylene waxes in an attempt to achieve low jetting temperatures of less than about 120° C., print robustness, and low cost fabrication while maintaining jetting reliability.

While known compositions and processes are suitable for their intended purposes, a need remains for phase change inks having low jetting temperatures of less than about 120° C., print robustness, and low cost fabrication while maintaining jetting reliability. There further remains a need for phase change ink compositions having improved fracture resistance, improved transfuse latitude, and desirable fold characteristics. There further remains a need for improved optimization of the ejection process to enable jettability at higher viscosities. Also, there is a need for phase change inks having improved transfuse latitude and low stand-by energy. In addition, a need remains for phase change inks which exhibit robustness, that is resistance to scratch, crease and abrasion with substantially no smear. There is also a need for phase change inks that can exhibit at least some of the above advantages with reduced energy requirements while printing. In addition, a need remains for phase change inks that print successfully on paper and transparency stock. Furthermore, there is a need for phase change inks that generate prints with good performance in automatic document feeders.

The appropriate components and process aspects of the each of the foregoing may be selected for the present disclosure in embodiments thereof.

SUMMARY

The present disclosure is directed to a phase change ink composition comprising (a) an ink vehicle; (b) a dispersing agent; (c) a colorant; and (d) organic fiber shaped nanowhiskers, inorganic fiber shaped nanowhiskers, or a combination of organic and inorganic fiber shaped nanowhiskers, wherein the organic fiber shaped nanowhiskers, the inorganic fiber shaped nanowhiskers, or a combination thereof, are encapsulated or functionalized to enhance compatibility with the ink vehicle; and wherein the colorant and the organic fiber shaped nanowhiskers, the inorganic fiber shaped nanowhiskers, or combination of organic and inorganic fiber shaped nanowhiskers are substantially resistant to aggregation and settling in the ink vehicle.

In embodiments, the ink vehicle carrier also includes at least one curable monomer, a phase change inducing agent, and an initiator.

Also disclosed herein are low energy solid inks comprising the organic phase change carrier described above. In embodiments, low energy inks are solid at a temperature below about 40° C. and have a viscosity of from about 5 to about 15 centipoise (cP) at a jetting temperature of from about 50° C. to about 150° C., such as from about 70° C. to about 130° C. or from about 80° C. to about 130° C. In certain specific embodiments, the low energy phase change ink is an ink that has a jetting temperature of about 120 degrees ° C. or lower and in embodiments a standby temperature of less than about 100 degrees ° C. The inks jet at lower temperatures, and thus require lower amounts of energy for jetting. The inks exhibit a substantially high degree of nanowhisker uniformity and a substantially reduced degree of nanowhisker aggregation.

Also disclosed is a phase change ink composition comprising: an ink vehicle; a dispersing agent; organic fiber shaped nanowhiskers, inorganic fiber shaped nanowhiskers, or a combination of organic and inorganic fiber shaped nanowhiskers; wherein the organic fiber shaped nanowhiskers, the inorganic fiber shaped nanowhiskers, or a combination thereof, are encapsulated or functionalized to enhance compatibility with the ink vehicle; and wherein the organic fiber shaped nanowhiskers, the inorganic fiber shaped nanowhiskers, or combination of organic and inorganic fiber shaped nanowhiskers are substantially resistant to aggregation and settling in the ink vehicle.

Also disclosed is a method including forming the above-described phase change ink composition by combining the nanowhiskers with other phase change ink vehicle components. In embodiments, a method for preparing a phase change ink composition comprises combining organic fiber shaped nanowhiskers, inorganic fiber shaped nanowhiskers, or a combination of organic and inorganic fiber shaped nanowhiskers, wherein the organic fiber shaped nanowhiskers, the inorganic fiber shaped nanowhiskers, or a combination thereof, are encapsulated or functionalized to enhance compatibility with the ink vehicle, with an ink vehicle comprising the fiber shaped nanowhiskers; optionally including a dispersing agent; combining a colorant with the ink vehicle to form a phase change ink composition wherein the colorant and the organic fiber shaped nanowhiskers, the inorganic fiber shaped nanowhiskers, or combination of organic and inorganic fiber shaped nanowhiskers are substantially resistant to aggregation and settling.

Another embodiment of this disclosure is directed to a method which comprises (a) incorporating into an ink jet printing apparatus an ink composition comprising (1) the above-described organic phase change vehicle and (2) a colorant; (b) melting the ink; and (c) causing droplets of the melted ink to be ejected in an imagewise pattern onto a substrate.

DETAILED DESCRIPTION

The present disclosure is directed to a phase change ink composition comprising an ink vehicle, a dispersing agent, a colorant, organic fiber shaped nanowhiskers, inorganic fiber shaped nanowhiskers, or a combination of organic and inorganic fiber shaped nanowhiskers, wherein the organic fiber shaped nanowhiskers, the inorganic fiber shaped nanowhiskers, or a combination thereof, are encapsulated or functionalized to enhance compatibility with the ink vehicle; and wherein the colorant and the organic fiber shaped nanowhiskers, the inorganic fiber shaped nanowhiskers, or combination of organic and inorganic fiber shaped nanowhiskers are substantially resistant to aggregation and settling.

In embodiments, nanometer sized particles, in the form of fiber or needle shaped nanowhiskers, can be provided. It is believed, although not wishing to be bound by theory, that, in embodiments, the modified fiber shaped nanowhiskers disclosed herein provide a phase change ink composition having improved fold characteristics, increased fracture resistance, and improved transfuse latitude of the phase change ink over previously available phase change inks. In embodiments, a low melt carbon black ink is provided having improved printing and imaging performance by incorporation into the distilled ink vehicle of encapsulated or functionalized nanowhiskers selected for compatibility with the ink vehicle.

Nanowhiskers herein can be any suitable size or shape. In specific embodiments herein, fiber shaped nanowhiskers are nano-elements having a cross-diameter of nanometer size, provided that the cross-diameter does not exceed about 500 nanometers and a length of nanometer or micron size. In embodiments the cross-diameter is as small as about 20 nanometers. In further embodiments, the cross-diameter is as small as about 0.5 nanometer. The length of these nano-elements in embodiments does not exceed about 2 microns, and the length to cross-diameter ratio is greater than about 1.2 and can be as high as about 300, although the size can be outside these ranges. In addition, the cross-section perpendicular to the cylindrical surface of the fiber-shaped nanowhiskers herein can be of any known shape including cylindrical, spherical, triangular, hexagonal, cubical, oval, among others, and may contain void area.

In selected embodiments, fiber shaped nanowhiskers herein comprise organoclay or alumina nanowhiskers having cross-diameters of about 2 to about 4 nanometers and an aspect ratio of about 20 to about 100 (aspect ratio being equivalent spherical diameter (radius) to length) such as those available from NanoCeram® fibers available from Argonide Corporation. In embodiments, the fiber shaped nanowhiskers comprise polyethylene nanowhiskers.

Organowhiskers can be obtained by any desired or suitable method. For example, fibers can be prepared as described in U.S. Pat. No. 5,935,883, of R. Pike, entitled "Super Fine Microfiber Nonwoven Web", issued Aug. 10, 1999, which is incorporated by reference herein in its entirety.

Bi-component fiber spinning can also be used to manufacture nanofibers. In this process, splittable fibers are prepared using a melt spinning process. The number of segments are typically sixteen or greater, and the process typically comprises using a water dissolvable polymer in a small ratio along with polyethylene terephthalate or polypropylene. The method comprises melt blowing INS (known as islands-in-the sea) fibers that contain greater than about 600 island fibrils having diameters as low as about 50 nanometers and which act as a regular melt blown fiber through fabric formation after which the sea polymer is dissolved and only the nanofibers are left.

See, also, for example, nano fibers media prepared using Hills Inc's special melt blowing die and Celanex® Next Generation JKX-1158 polymer, http://www.nanotech-now.com/news.cgi?story_id=27515, which is incorporated by reference herein.

In embodiments, the nanowhiskers are prepared using nanoreactor technologies, for example nanoreactor extrusion technology. For example, one embodiment, includes use of a new class of mesoporous materials called mesoporous silica fiber, consisting of uniformly sized mesopores arranged in a parallel direction to the fiber axis, as nano-extruders to prepare in-situ thin (for example, from about 30 to about 50 nanometer) polyethylene (PE) fibers of extended-chain crystals. For further details, see Kageyama et al. in Science, Vol. 285, September 1999, p. 2113-2115, which is incorporated by reference herein.

The nanowhiskers comprise, in embodiments, at least one of fiber shaped inorganic nanowhiskers, fiber shaped organoclay nanowhiskers, fiber shaped alumina nanowhiskers, fiber shaped organic nanowhiskers, or a combination thereof, which are modified, such as encapsulated or functionalized to enhance compatibility with the ink vehicle. In embodiments, the surface properties of these nanowhiskers can be modified, for example, chemically modified, physically modified, encapsulated or functionalized so as to produce fiber shaped nanowhiskers having desired properties. In embodiments, the nanowhiskers are encapsulated with a hydrophobic material. In other embodiments, the fiber shaped nanowhiskers comprise organo-clay nanowhiskers that have been surface treated with alumina. In other embodiments, the fiber shaped nanowhiskers can be silanized, for example with 3-aminopropyl-triethoxysilane to which is further attached a fatty acid or alkoyl chloride derivative, to increase the hydrophobicity of the fibers facilitating stable dispersion of the fibers into non-aqueous media.

In another embodiment, the fiber shaped nanowhiskers can be coated or encapsulated, for example with a polyethylene, to make them compatible with the low energy inks. In embodiments, the encapsulation component, for example, polyethylene, can itself be functionalized. Coating or encapsulating can be done by any suitable or desired method. For example, this can be simply done by pre-dispersing the fiber shaped nanowhiskers in a polyethylene in the presence of an appropriate dispersant. In embodiments, fiber shaped nanowhiskers are chemically modified to be easily dispersible in the hot melt ink vehicle. In embodiments, the fiber shaped nanowhiskers are combined with the phase change ink carrier, in embodiments, an organic phase change ink carrier, so that there is a substantially uniform distribution of the nanowhiskers within the ink matrices. In embodiments, the ink is formed with a substantially reduced aggregation of the nanowhiskers so that they are discretely distributed.

The fiber shaped nanowhiskers can include colored pigments, many of which are available commercially. In embodiments, the fiber shaped nanowhiskers themselves can be colored by coating them with a colorant and so can be used to steer the color of the ink, such as, for example, carbon black ink. In embodiments herein, the colorant comprises colored organic fiber shaped nanowhiskers, colored inorganic fiber shaped nanowhiskers, or a combination of colored organic and colored inorganic fiber shaped nanowhiskers. In one embodiment, the nanowhiskers are first dispersed with the help of a homogenizer in a dye-containing solution, in the second step the solvent is evaporated to yield a nanowhisker/dye composite that can be further dispersed in an ink vehicle, said ink vehicle being a non-solvent for the dye. Alternatively a reactive dye can be used to attach the dye to the nanowhiskers using processes similar to those used to dye synthetic and natural textile fibers.

In embodiments, the fiber shaped nanowhiskers can function as an ink stabilizer thus improving the toughness or mechanical robustness of the ink upon solidification. In this case, the fiber shaped nanowhiskers can act as a nucleus for the crystallization of the phase change ink vehicle. This results in the present inks having a unique morphology associated with the use of the fiber shaped nanowhiskers in which they can be self aligned and resistant to substantial aggregation in the ink matrix. In a specific embodiment, aligning of the fiber shaped nanowhiskers nanoparticles can occur within the organic phase change ink vehicle. Nanoparticles can self-align at the interfaces formed in the ink upon solidification/crystallization, the result of two or more of the ink components not being fully miscible.

In embodiments, the fiber shaped nanowhiskers herein can include organoclay nanoplatelets and be surface-treated with alumina. For example, biobased epoxy nanocomposite materials containing functionalized vegetable oils, such as epoxidized linseed oil and epoxidized soybean oil, can be processed with organomontmorillonite and silanized alumina nanowhiskers. A certain amount of diglycidyl ether of bisphenol F is replaced by the epoxidized linseed oil or epoxidized soybean oil in the matrix. The selection of the bisphenol F, functionalized vegetable oil, anhydride curing agent, and organomontmorillonite clay/alumina nanowhiskers results in an excellent combination, providing biobased epoxy nanocomposites showing a high elastic modulus, a high glass transition temperature, and a high fracture toughness with larger amounts of functionalized vegetable oil. The Izod impact strength and fracture toughness of biobased neat epoxy are significantly improved depending on the functionalized vegetable oil, when phase separation is observed. Phase separation does not occur with the addition of exfoliated and intercalated clay nanoplatelets. The fracture toughness and the critical energy release rate of intercalated clay nanocomposites is higher than those of exfoliated clay nanocomposites. This correlates to a rougher fracture surface area observed by scanning electron microscopy. Fabricating exfoliated clay nanocomposites and alumina nanocomposites can be accomplished using the following procedure. 5.0 wt % organo-clay or surface-treated alumina nanowhiskers is sonicated in acetone for 2 hours using a solution concentration of more than 30 L of acetone to 1 kg of nanoreinforcements, with constant stirring by a magnetic stirrer. diglycidyl ether of bisphenol F and functionalized vegetable oil are added and mixed with a magnetic stirrer for an additional 1 hour. The acetone is removed by vacuum extraction at approximately 100° C. for 24 hours, after which the anhydride curing agent is blended into the solution with a magnetic stirrer. After all components are mixed, the specimens are cured at 80° C. for 4 hours, followed by 160° C. for 2 hours. Intercalated clay nanocomposites are processed without the sonication mentioned above; the clay particles are directly added to diglycidyl ether of bisphenol F and mixed by a magnetic stirrer for 30 minutes. The same curing condition is used for the intercalated clay nanocomposites. The storage modulus of bio-based epoxy can be improved by adding organoclay nanoplatelets and surface-treated alumina nanowhiskers, in specific embodiments, with the addition of the alumina nanowhiskers. For further details, see Miyagawa, et al. in "Effect of Clay and Alumina-Nanowhisker Reinforcements on the Mechanical Properties of Nanocomposites from Biobased Epoxy: A Comparative Study," Ind. Eng. Chem. Res., 2004, 43, pp. 7001-7009, which is totally incorporated by reference herein.

In embodiments, the fiber shaped nanowhiskers herein can comprise nanowhiskers, encapsulated with polyethylene. The polyethylene encapsulated nanowhiskers can be uniformly dispersed in a resin matrix to form an organic/inorganic network providing good mechanical properties materials. These materials can be prepared by any suitable or desired method. For example, organic/inorganic nanocomposites of polyethylene can be prepared via in-situ coordination polymerization. A Ziegler-Natta catalyst can first be supported on the surface of silicate nanowhiskers to subsequently initiate the polymerization of ethylene on the surface of these nanowhiskers. Further details are described by Rong et al. in "A Polyethylene Nanocomposite Prepared via In-Situ Polymerization," Macromol. Rapid Commun., 2001; 22, pp. 329-334, which is totally incorporated by reference herein.

In embodiments, the fiber shaped nanowhiskers can be treated by a one step melt mixing grafting reaction on surface-modified layered silicate. Melt mixing of functionalized polyolefins with a surface-modified layered silicate (montmorillonite) can be used to prepare the corresponding micro/nanocomposites, for example, polypropylene-clay nanocomposites. The effect of the diethyl succinate groups, derived form the grafting of diethyl maleat (DEM) onto the polyolefins, on compatibility with an organic filler and the dispersion in a hydrophobic matrix has been extensively investigated by Passaglia et al. In order to avoid possible interference by polymer multiphase morphology, the amorphous poly(propylene-ran-ethylene) (EPM) (70/30, wt/wt), functionalized with DEM (EPM-graft-DEM), can be used in melt mixing with alkyl-ammonium-salt-modified montmorillonite at different weight ratios by using a Brabender mixer. Materials with a nanoscale dispersion of the inorganic phase, as revealed by X-ray diffraction (XRD) and transmission electron microscopy (TEM) analyses, are obtained. Specific interactions, involving the carbonyl groups of the polyolefin functional groups and the polar sites on the filler surface, assist intercalation and/or exfoliation of the layered system. Similar results can be obtained by starting with an unfunctionalized EPM and by performing the grafting reaction with DEM during melt mixing according to a one-step simplified procedure. Further details are described by Passaglia et al. in "Effect of functional groups of modified polyolefins on the structure and properties of their composites with lamellar silicates," Polymer International; 2005; 54(11), pp. 1549-1556, which is totally incorporated by reference herein. Passaglia et al. describe preparation of EPM/clay nanocomposites as follows. Composites of EPM and 5 wt % of the two types of clay (sodium (D HPS) and organophilic (D 72T) bentonite (montmorillonite), provided by Laviosa Chimica Mineraraia SpA, Livorno, Italy) were prepared by melt compounding at 180° C.: 20 g of EPM (or EPM-graft-DEM) were 'melt mixed' with 1 g of clay, using a screw speed of 60 rpm and a mixing time of 20 min in all cases. The same procedure was also used to prepare composites of EPM-graft-DEM. Samples EPM-f-D 72T (a, b and c) were prepared by 'melt-mixing', at 180° C. and 60 rpm, EPM with a clay prepared by absorbing functionalizing reagents onto organophilic bentonite (D 72T). Again, for this series of runs 20 g of EPM were introduced into the Brabender mixer and after 2 min a mixture composed of organoclay, DEM and DCP was added (see Table 5 for composition). The collected products were extracted with boiling acetone to remove any low-molecular-weight materials and finally with boiling toluene to determine the amounts of insoluble polymer fractions.

In embodiments, the fiber shaped nanowhiskers herein comprise materials described by Passaglia et al. in "Effect of functional groups of modified polyolefins on the structure and properties of their composites with lamellar silicates," Polymer International; 2005; 54(11), pp. 1549-1556, which is totally incorporated by reference herein.

TABLE 5

Data obtained for the composites from reactive blending (Passaglia et al., page 1554)

| Material | DEM (mol %)[a] | DCP (mol %)[a] | D72T (wt %)[b] | FD (mol %)[c] | Residue (wt %)[d] |
|---|---|---|---|---|---|
| EPM-f-D 72Ta | 0.9 | 0.06 | 5 | 0.37 | 5.6 |
| EPM-f-D 72Tb | 1.35 | 0.09 | 7.5 | 0.49 | 23.8 |
| EPM-f-D 72Tc | 1.8 | 0.12 | 10 | 0.74 | 41.4 |

[a]With respect to 100 monomeric units of polymer in the feed.
[b]With respect to 100 g of polymer
[c]Determined following the procedure reported in Passaglia et al., Gazz Chim Ital 127: 91-95 (1995), expressed as the number of grafted molecules per 100 monomeric units of polymer
[d]After solvent extraction of the composite, using acetone and toluene In embodiments, the fiber shaped nanowhiskers herein comprise functionalized polyethylene nanocomposites. The functional polyethylene nanocomposites can be prepared by any desired or suitable method. For example, polyethylene can be modified by grafting maleic anhydride (MAH) monomer in order to make the main chain of polyethylene have polar groups. Polyethylene/montmorillonite nanocomposites is prepared by melt mixing the modified polyethylene with organic montmorillonite. FT-IR can be used to test whether the MAH has been grafted on the main chain of polyethylene. XRD and TEM can be employed to characterize the nanocomposites. Montmorillonite has a good dispersion in the matrix. Analysis of thermal and crystal properties indicates that the nanocomposites have a better thermal stability and a higher crystal temperature comparing with the pristine matrix. Further details for preparing fiber shaped nanowhiskers comprising functional polyethylene nanocomposites is described by Hong-Bo Zhai; Yong-Mei Li; Han-Yang Guo; Chang-Feng Liu; Zheng-Fa Zhou; Qiu-Sheng Song; and Wei-Bing Xu, Hefei, University of Technology; Hefei Rongshida Electronic Co. Ltd., in Polymer Materials Science and Engineering 21, No. 4, July 2005, pp. 252-255, which is totally incorporated by reference herein.

In embodiments, Ziegler-Natta catalysts can be intercalated into the galleries between the silicate layers of modified organic montmorillonite (OMMT). Polyethylene/montmorillonite (PE/MMT) nanocomposites can be prepared via in-situ intercalative polymerization of ethylene. Characterization studies indicate that the space between MMT layers in OMMT is broadened from 1.26 nm to 3.53 nm and the MMT layers are homogeneously dispersed in the PE matrix of PE/MMT. Compared with pure PE, the thermal and mechanical properties of PE/MMT are improved to different extents. See, Japanese Journal of Applied Physics, Vol. 44, No. 1B, 2005, pp. 658-661, URL:http://jjap.ipap.jp/link?JJAP/44/658/DOI:10.1143/JJAP.44.658, Synthesis of Polyethylene/Montmorillonite. Nanocomposites by In-situ Intercalative Polymerization, Fan Zhang, Sanxi Li, Tomoaki Karaki and Masatoshi Adachi, Department of Electronics and Informatics, Faculty of Engineering, Toyama Prefectural University, Kosugi-machi, Toyama 939-0398, Japan; School of Materials Science and Engineering, Shenyang Institute of Chemical Technology, Shenyang 110142, China; (Received Jun. 28, 2004; accepted Sep. 9, 2004; published Jan. 24, 2005), incorporated by reference herein.

In embodiments, the fiber shaped nanowhiskers herein can comprise 3-aminopropyltriethoxysilane monolayer grafted on a silica surface. In embodiments, fatty acids or alkoyl chlorides can then be grafted on the surface modified silica surfaces. These fiber shaped nanowhiskers can be prepared by any suitable or desired method, for example, grafting 3-aminopropyltriethoxysilane onto a silica surface (for example, a silica surface in the form of a native oxide layer of a silicon wafer) can comprise degreasing the silica surfaces, hydrolyzing the surfaces, and drying. Degreasing can be done by successive immersion in (i) a boiling solution of dichloromethane; (ii) a boiling solution of methanol; (iii) a solution of acetone; and repeated followed by rinsing in pure water. The silica surfaces can be hydrolyzed in boiling water, such as by dipping for one hour in boiling water, and dried by heating, such as y heating for 30 minutes in a 420° C. oven followed by heating under an oxygen flow for one hour in a 420° C. oven. In the acid aqueous solution, acetone/water (1:5 v/v) pH 3.5 (by adding HCL), the APTES concentration used is $1.2 \times 10\,2$ M. The silanization reaction is obtained by immersing the silica sample in the silanization medium, and the surfaces are then extensively rinsed with water. In this embodiment, the silica behaves like a hydrophilic surface. Another method, can comprise anhydrous grafting wherein the silica behaves like a hydrophobic surface. In this method, the silica surfaces are rinsed and modified by APTES grafting, and silica surfaces are cleaned with acetone. They are soaked for 5 minutes in sulfuric acid and hydrogen peroxide (1:1, v/v). The silanization solution concentration is $1.2 \times 10\,2$ M dissolved in anhydrous hexane. The APTES grafted surfaces can be rinsed with methanol and manually dried in room atmosphere to eliminate excess silanes deposited on the surface. Details are described by Simon et al., in J. of Colloid and Interface Science, 2002, 251, pp. 278-283, which is incorporated by reference herein.

In further embodiments, the fiber shaped nanowhiskers herein can comprise rhodamine B grafted on functionalized silica surfaces. For example, in embodiments, the fiber shaped nanowhiskers herein can be prepared using methods as described by Arslan et al., in Turk J. of Chem., 2006, 30, pp. 203-210, which is totally incorporated by reference herein. Glass beads can be surface modified with an aminosilane layer (3-aminopropyl)-triethoxysilane). The self-assembled monolayers provide functionalization by organic molecules containing suitable functional groups like —SH, —CN, —COOH, —$NH_2$ and silanes. Flexibility with respect to terminal functionalities of the organic molecules allows control of the hydrophobicity or hydrophilicity of surfaces. Surface modification of glass beads having average diameters of 2.8 millimeters can be done as follows. Prior to monolayer preparation, the glass beads are treated for 1 hour in boiling piranha solution (3:1 concentrated $H_2SO_4$:$H_2O_2$). Note: use Caution—Piranha solution is an extremely strong oxidant and should be handled very carefully. After 1 hour, the glass beads are removed from the cleaning solution, rinsed with high purity water (Ultrapure Milli-Q Reagent Water System Millipore) and dried in a stream of nitrogen until they appeared dry just prior to self-assembled monolayer (SAM) deposition. The freshly cleaned glass beads are immersed in 1% (w/w) APTES in anhydrous toluene for 24 hours with agitation as described by L. Lin et. al. in Langmuir 19, page 6968 (2003), which is hereby incorporated by reference herein. Toluene is freshly distilled from sodium. After the glass beads had been removed from the solution, followed by a sequence of 2 washes with anhydrous toluene, deionized water and ethanol were employed to remove any physisorbed APTES. The glass beads are dried in nitrogen atmosphere. This attachment protocol results in partial monolayers of APTES with a coverage of about 1 residue/$nm^2$, as compared to coverages of about 2 residues/$nm^2$ reported in most literature studies of APTES monolayers prepared under anhydrous conditions. The lower coverages are chiefly attributed to washing of the glass beads with deionized water prior to curing, which is expected to remove silane molecules that are not already covalently bonded prior to curing. APTES-derivatised glass beads are placed in a solution of 0.2 mL of triethylamine and 15 mg of Rhodamine-B in 20 mL of acetonitrile. The reaction is allowed to proceed for 24 hours at room temperature, followed by washing 3 times with acetonitrile, twice with ethanol, and a last wash with dichloromethane, followed by overnight drying in nitrogen atmosphere. For further process details, see S. Flink et al. in J. Phys. Org. Chem. 14, pages 407-415 (2001), which is hereby incorporated by reference herein, In embodiments, the fiber shaped nanowhiskers herein can comprise nanoparticles modified by surface initiated polymerization. Surface initiated polymerization from nanoparticle surfaces involves the growth of end-tethered polymer brushes where the length or thickness can be more than twice the radius of gyration (Rg) compared to a free polymer in solution. Different mechanisms are possible on a variety of initiators, reaction conditions, monomers, and nanoparticles. Important differences to solution and bulk polymerization can be observed where the nanoparticles with grafted initiators behave as macroinitiators. In turn, the development of these materials will allow the preparation of thermodynamically and kinetically stable nanocomposites and colloids. Examples of surface initiated polymerization techniques that are suitable for the preparation of stable nanocomponent particles include, in embodiments, those that involve preparing core-shell particles. An organic shell determines the external chemical properties of the nanoparticles while their physical properties are governed by both size and shape of the core of the particle and the surrounding organic layer. Polymerization from the nanoparticle surface affords control of the polymer grafting density, composition, microstructure and molar mass. Another way to tailor surfaces is by self-assembled monolayers around each nanoparticle that helps stabilize them in suspension. In embodiments, a dense shell structure is prepared by use of self-assembled monolayer coatings on nanoparticles with the functionality to initiate, polymerization, for example, as described by Rigoberto C. Advincula, Department of Chemistry, University of Houston, 77204-5003, Houston, Tex., USA. For further details regarding different polymerization mechanisms and procedures towards forming core-shell types of hybrid inorganic-organic polymer nanoscale materials, see, Advincula, Journal of Dispersion Science and Technology, Taylor & Francis, Vol. 24, Number 3 & 4, 2003, pp. 343-361, which is totally incorporated by reference herein.

In embodiments, the nanowhiskers can be surface modified by a number of polymerization methods as described by Advincula: 1) surface initiated free radical polymerization (SI-FRP Techniques); 2) Surface initiated atom transfer radical polymerization (ATRP); 3) Living anionic surface initiated polymerization; 4) Surface initiated ring opening metathesis polymerization (ROMP); 5) Surface initiated living cationic polymerization; 6) Surface initiated hyperbranched polymerization.

In embodiments, the fiber shaped nanowhiskers herein can comprise nanofibers prepared by extrusion polymerization. For example, crystalline nanofibers of linear polyethylene with an ultrahigh molecular weight (6,200,000) and a diameter of 30 to 50 nanometers can be formed by the polymerization of ethylene with mesoporous silica fiber-supported titanocene, with methylalumoxane as a cocatalyst. Small-angle x-ray scattering analysis indicates that the polyethylene fibers consist predominantly of extended-chain crystals, indicating a potential utility of the honeycomb-like porous framework as an extruder for nanofabrication of polymeric materials. Further details are described by Kageyama et al. in "Extrusion Polymerization: Catalysed Synthesis of Crystalline Linear Polyethylene Nanofibers Within a Mesoporous Silica," SCIENCE, Vol. 285, 24 Sep. 1999, pp. 2113-2115, which is totally incorporated by reference herein.

The nanowhiskers can, in an embodiment herein, be dispersed in a solvent, such as a low boiling solvent, and can then be transferred from the solvent phase to the ink vehicles where they are uniformly disseminated in the organic phase change vehicle and in the low energy phase change ink. In certain specific embodiments, the low energy phase change ink is an ink that has a jetting temperature of about 120 degrees ° C. or lower and in embodiments a standby temperature of less than about 100 degrees ° C. The solvent can in one embodiment be an organic solvent, and in another embodiment be a low boiling organic solvent. These solvents in one embodiment have a boiling point of equal to or less than about 150° C., in another embodiment have a boiling point of equal to or less than about 130° C., and in a further embodiment have a boiling point equal to or less than about 100° C., although the boiling point can be outside of these ranges. In one embodiment these solvents can be low boiling alcohols, glycols, glycol ethers, glycol acetates, ketones, acetamides, and the like, as well as mixtures thereof. In another embodiment, these solvents can be methanol, isopropanol, ethylene glycol, ethylene glycol mono-n-propyl ether, methyl ethyl ketone, methyl isobutyl ketone, propylene glycol mono-methyl ether acetate, N,N-dimethyl acetamide, and the like, as well as mixtures thereof.

The loading of nanowhiskers in the solvent in one embodiment is at least about 5% by weight, in another embodiment at least about 15% by weight, in another embodiment at least about 20% by weight, and in a further embodiment at least about 25% by weight, in one embodiment equal to or less than about 45% by weight, in another embodiment equal to or less than about 40% by weight, and in a further embodiment equal to or less than about 35% by weight, although the loading can be outside of these ranges.

The fiber shaped nanowhiskers are of any desired or effective particle size, as discussed herein. In embodiments, nanowhiskers having diameters of about 2 to about 4 nanometers and an aspect ratio of about 20 to about 100 (aspect ratio being equivalent spherical diameter (radius) to length) such as those available from NanoCeram Fibers, Argonide Corporation are selected.

The fiber shaped nanowhiskers (dry-weight) are present in the phase change vehicle in any desired or effective amount. In one embodiment in an amount of at least about 0.1% by weight of the ink to about 35% by weight of the ink, or about 1% by weight of the ink, in another embodiment of at least about 5% by weight of the ink, and in yet another embodiment of at least about 10% by weight of the ink, and in one embodiment equal to or less than about 40% by weight of the ink, in another embodiment equal to or less than about 35% by weight of the ink, and in yet another embodiment equal to or less than about 25% by weight of the ink, although the amount can be outside of these ranges.

In another embodiment, the fiber shaped nanowhiskers selected can be metal-oxide or mixed metal oxide particles such as those commercially available from Nanophase Technologies as Nano Tek™ Zinc Oxide, Nano Tek™ Cerium oxide doped with Zinc Oxide, the particles being prepared by a Physical Vapor Synthesis (PVS). These particles can be modified by Nanophase through a discrete particle encapsulation process to enhance their dispersability in various vehicles. For example, encapsulation with hydrophobic materials is selected for ink applications. In embodiments, organosilane coatings can be used to enable dispersions in organic systems such as solid inks.

In a further embodiment, the fiber shaped nanowhiskers can be modified through a sol-gel process to form nanowhiskers that can be easily dispersed in the curable phase change inks disclosed herein. The inorganic fiber shaped nanowhiskers can be added to a solvent such as toluene. In embodiments, from about 5% and equal to or less than about 20 weight % of a silicon ester or mixture of silicon esters can be added. Mono, di and tri-alkoxy esters can be employed. The dispersion can then be subjected to high intensity sonication to initiate the sol-gel chemistry. No acid or base catalyst needs to be employed as the surface absorbed water acts to initiate hydrolysis under this high energy acoustical agitation. Hydrolysis and condensation can then proceed resulting in a surface passivation of the particles. After this treatment, the particles can form an optically transparent dispersion which shows substantially no tendency to settle. See, for example, U.S. Patent Publication 20070119340 of Marcel P. Breton et al., U.S. Ser. No. 11/291,540, Published May 31, 2007, entitled "Ink Carriers Containing Nanoparticles, Phase Change Inks Including Same and Methods for Making Same" which is hereby incorporated by reference herein in its entirety.

In embodiments, a process for preparing a phase change ink composition comprises combining organic fiber shaped nanowhiskers, inorganic fiber shaped nanowhiskers, or a combination of organic and inorganic fiber shaped nanowhiskers with an ink vehicle comprising the fiber shaped nanowhiskers; optionally including a dispersing agent; combining a colorant with the ink vehicle to form a phase change ink composition wherein the colorant and the organic fiber shaped nanowhiskers, the inorganic fiber shaped nanowhiskers, or combination of organic and inorganic fiber shaped nanowhiskers are substantially resistant to aggregation and settling.

In a specific embodiment, the nanowhiskers are first dispersed in the polar resin component(s) (polar resin components being for example the carrier compositions with the exception of the hydrocarbon polyethylene waxes) of the ink compositions, such dispersion being obtained by co-extruding the nanowhiskers and optionally the dye or pigment colorant with the polar resin component(s). The concentrate thus obtained is then used to formulate the ink of the present disclosure.

For example, in embodiments, polar resin components are materials having a Hansen Solubility Parameter of 8.5 or above (unit: $(cal/cc)^{1/2}$). In a specific embodiment, the concentrate contains all of the ink components except the hydrocarbon polyethylene, solubility parameter value of 8.3 $(cal/cc)^{1/2}$. The ink may also contains materials with Hansen solubility parameter of less than 8.3. Solubility may also be expressed in terms of $MPa^{1/2}$, 1 Hildebrand=1 $(cal/cc)^{1/2}$=0.48888×$MPa^{1/2}$ Optionally, the nanowhisker composite is added directly to the ink containing already the colorant.

Phase change ink compositions of the present disclosure contain a phase change carrier system or composition (that is, ink vehicle). The phase change carrier composition is typically designed for use in either a direct printing mode or an indirect or offset printing transfer system.

In the direct printing mode, the phase change carrier composition in one embodiment contains one or more materials that enable the phase change ink (1) to be applied in a thin film of uniform thickness on the final recording substrate (such as paper, transparency material, and the like) when cooled to ambient temperature after printing directly to the recording substrate, (2) to be ductile while retaining sufficient flexibility so that the applied image on the substrate will not fracture upon bending, and (3) to possess a high degree of lightness, chroma, transparency, and thermal stability.

In an offset printing transfer or indirect printing mode, the phase change carrier composition in one embodiment exhibits not only the characteristics desirable for direct printing mode inks, but also certain fluidic and mechanical properties desirable for use in such a system, as described in, for example, U.S. Pat. No. 5,389,958, the disclosure of which is totally incorporated herein by reference.

The ink carrier (ink vehicle) is present in the phase change ink of the present disclosure in any desired or effective amount, in one embodiment of at least about 0.1 percent by weight of the ink, in another embodiment of at least about 50 percent by weight of the ink, and in yet another embodiment of at least about 90 percent by weight of the ink, and in one embodiment of no more than about 99 percent by weight of the ink, in another embodiment of no more than about 98 percent by weight of the ink, and in yet another embodiment of no more than about 95 percent by weight of the ink, although the amount can be outside of these ranges.

Any desired or effective carrier composition can be used. Examples of suitable ink carrier materials include fatty amides, such as monoamides, tetraamides, mixtures thereof, and the like. The amide can be present in one embodiment in an amount of at least about 1% by weight of the ink carrier, in another embodiment of at least about 2% by weight of the ink carrier, and in yet another embodiment of at least about 3% by weight of the ink carrier, and in one embodiment equal to or less than about 30% by weight of the ink carrier, in another embodiment equal to or less than about 15% by weight of the ink carrier, and in yet another embodiment equal to or less than about 5% by weight of the ink carrier, although the amount can be outside of these ranges. Specific examples of suitable fatty amide ink carrier materials include stearyl stearamide, a dimer acid based tetra-amide that is the reaction product of dimer acid, ethylene diamine, and stearic acid, a dimer acid based tetra-amide that is the reaction product of dimer acid, ethylene diamine, and a carboxylic acid having at least about 36 carbon atoms, and the like, as well as mixtures thereof. When the fatty amide ink carrier is a dimer acid based tetra-amide that is the reaction product of dimer acid, ethylene diamine, and a carboxylic acid having at least about 36 carbon atoms, the carboxylic acid is of the general formula

wherein R is an alkyl group, including linear, branched, saturated, unsaturated, and cyclic alkyl groups, said alkyl group in one embodiment having at least about 36 carbon atoms, in another embodiment having at least about 40 carbon atoms, said alkyl group in one embodiment having no more than about 200 carbon atoms, in another embodiment having no more than about 150 carbon atoms, and in yet another embodiment having no more than about 100 carbon atoms, although the number of carbon atoms can be outside of these ranges. Carboxylic acids of this formula are commercially available from, for example, Baker Petrolite, Tulsa, Okla., and can also be prepared as described in Example 1 of U.S. Pat. No. 6,174,937, the disclosure of which is totally incorporated herein by reference. Further information on fatty amide carrier materials is disclosed in, for example, U.S. Pat. No. 4,889,560, U.S. Pat. No. 4,889,761, U.S. Pat. No. 5,194,638, U.S. Pat. No. 4,830,671, U.S. Pat. No. 5,372,852, U.S. Pat. No. 5,597,856, U.S. Pat. No. 6,174,937, and British Patent GB 2 238 792, the disclosures of each of which are totally incorporated herein by reference.

Also suitable as phase change ink carrier materials are isocyanate-derived resins and waxes, such as urethane isocyanate-derived materials, urea isocyanate-derived materials, urethane/urea isocyanate-derived materials, mixtures thereof, and the like. Further information on isocyanate-derived carrier materials is disclosed in, for example, U.S. Pat. No. 5,750,604, U.S. Pat. No. 5,780,528, U.S. Pat. No. 5,782,966, U.S. Pat. No. 5,783,658, U.S. Pat. No. 5,827,918, U.S. Pat. No. 5,830,942, U.S. Pat. No. 5,919,839, U.S. Pat. No. 6,255,432, U.S. Pat. No. 6,309,453, British Patent GB 2 294 939, British Patent GB 2 305 928, PCT Publication WO 94/14902, and PCT Publication WO 95/04760, the disclosures of each of which are totally incorporated herein by reference.

Mixtures of fatty amide materials and isocyanate-derived materials can also be employed as the ink carrier composition for inks of the present disclosure.

The ink carrier may contain a branched triamide such as those described in U.S. Pat. No. 6,860,930, the disclosure of which is totally incorporated herein by reference, including compounds of the formula

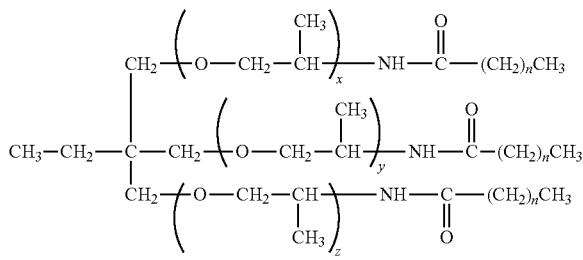

wherein n has an average value of from about 34 to equal to or less than about 40, where x, y and z can each be zero or an integer, and wherein the sum of x, y, and z is from about 5 to equal to or less than about 6.

Additional suitable phase change ink carrier materials for the present disclosure include paraffins, microcrystalline waxes, polyethylene waxes, ester waxes, amide waxes, fatty acids, fatty alcohols, fatty amides and other waxy materials, sulfonamide materials, resinous materials made from different natural sources (such as, for example, tall oil rosins and rosin esters), and many synthetic resins, oligomers, polymers and copolymers, such as ethylene/vinyl acetate copolymers, ethylene/acrylic acid copolymers, ethylene/vinyl acetate/acrylic acid copolymers, copolymers of acrylic acid with polyamides, and the like, ionomers, and the like, as well as mixtures thereof. One or more of these materials can also be employed in a mixture with a fatty amide material and/or an isocyanate-derived material.

A dispersant can be present in the ink in any desired or effective amount for purposes of dispersing and stabilizing the pigment, and the fiber shaped nanowhiskers present in the ink vehicle. The dispersant is present in any desired or effective amount, in one embodiment of at least about $1 \times 10^{-5}$% by weight of the ink carrier, in another embodiment of at least about $1 \times 10^{-3}$% by weight of the ink carrier, and in yet another embodiment of at least about $5 \times 10^{-1}$% by weight of the ink carrier, and in one embodiment equal to or less than about 30% by weight of the ink carrier, in another embodiment equal to or less than about 20% by weight of the ink carrier, and in yet another embodiment equal to or less than about 10% by weight of the ink carrier, although the amount can be outside of these ranges. Specific examples of suitable dispersants are polyalkylene succinimide dispersants such as those disclosed in U.S. Pat. No. 6,858,070, the disclosure of which is totally incorporated herein by reference. In embodiments, the dispersing agent is selected from compounds of the formula

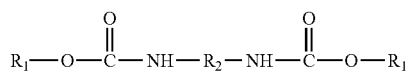

wherein $R_1$ is an alkyl group (including linear, branched, saturated, unsaturated, cyclic, unsubstituted, and substituted alkyl groups, and wherein hetero atoms, such as oxygen, nitrogen, sulfur, silicon, phosphorus, boron, and the like either may or may not be present in the alkyl group), in one embodiment with at least about 1 to about 20 carbon atoms, in another embodiment with at least about 1 to about 10 carbon atoms, in another embodiment with at least about 5 to about 36 carbon atoms, although the number of carbon atoms can be outside of these ranges;

wherein $R_2$ is an alkylene group, (including linear, branched, saturated, unsaturated, cyclic, an alkylene group including aliphatic cyclic moieties therein, unsubstituted, and substituted alkylene groups, and wherein hetero atoms, such as oxygen, nitrogen, sulfur, silicon, phosphorus, boron, and the like either may or may not be present in the alkylene group), in one embodiment with at least 1 carbon atom, in another embodiment with at least about 10 carbon atoms, in yet another embodiment with at least about 20 carbon atoms, in still another embodiment with at least about 36 carbon atoms, in one embodiment with no more than about 200 carbon atoms, in another embodiment with no more than about 100 carbon atoms, in another embodiment, with no more than about 60 carbon atoms, in yet another embodiment with no more than about 40 carbon atoms, although the number of carbon atoms can be outside of these ranges; an arylene group (including unsubstituted and substituted arylene groups, and wherein hetero atoms, such as oxygen, nitrogen, sulfur, silicon, phosphorus, boron, and the like either may or may not be present in the arylene group), in one embodiment with at least about 6 carbon atoms, in another embodiment with at least about 13 carbon atoms, in still another embodiment with at least about 18 carbon atoms, and in yet another embodiment with at least about 23 carbon atoms, and in one embodiment with no more than about 100 carbon atoms, in another embodiment with no more than about 75 carbon atoms, and in yet another embodiment with no more than about 50 carbon atoms, although the number of carbon atoms can be outside of these ranges; an arylalkylene group (including unsubstituted and substituted arylalkylene groups, and wherein hetero atoms, such as oxygen, nitrogen, sulfur, silicon, phosphorus, boron, and the like either may or may not be present in either the aryl or the alkyl portion of the arylalkylene group), in one embodiment with at least about 7 carbon atoms, in another embodiment with at least about 18 carbon atoms, in yet another embodiment with at least about 30 carbon atoms, in another embodiment with at least about 42 carbon atoms, and in one embodiment with no more than about 200 carbon atoms, in another embodiment with no more than about 100 carbon atoms, and in yet another embodiment with no more than about 44 carbon atoms, although the number of carbon atoms can be outside of these ranges; an alkylarylene group, (including unsubstituted and substituted alkylarylene groups, and wherein hetero atoms, such as oxygen, nitrogen, sulfur, silicon, phosphorus, boron, and the like either may or may not be present in either the alkyl or the aryl portion of the alkylarylene group), in one embodiment with at least about 7 carbon atoms, in another embodiment with at least about 18 carbon atoms, in yet another embodiment with at least about 30 carbon atoms, in another embodiment with at least about 42 carbon atoms, and in one embodiment with no more than about 200 carbon atoms, in another embodiment with no more than about 100 carbon atoms, and in yet another embodiment with no more than about 44 carbon atoms, although the number of carbon atoms can be outside of these ranges; and wherein the substituents on the substituted alkyl, aryl, arylalkyl, alkylaryl, alkylene, arylene, arylalkylene, and alkylarylene groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring. Materials of this formula are commercially available as, for example, PETROLITE® CA-11, PETROLITE® WB-5, and WB-17 from Baker-Petrolite.

A rosin ester resin, mixtures thereof, or the like can also be included in the ink carrier. The rosin ester resin is present in the ink carrier in any desired or effective amount, in one embodiment of at least about 0.5% by weight of the ink carrier, in another embodiment of at least about 2% by weight of the ink carrier, and in yet another embodiment of at least about 3% by weight of the ink carrier, and in one embodiment of equal to or less than about 20% by weight of the ink carrier, in another embodiment equal to or less than about 15% by weight of the ink carrier, and in yet another embodiment equal to or less than about 10% by weight of the ink carrier, although the amount can be outside of these ranges. Examples of suitable rosin ester resins include PINECRYSTAL® KE-100 (commercially available from Arakawa), and the like.

In embodiments, the phase change ink is a curable ink comprising an ink vehicle, at least one curable monomer or prepolymer, at least one gellant, optionally, a reactive oligomer; optionally, at least one low molecular weight photoinitiator, a colorant, and organic fiber shaped nanowhiskers, inorganic fiber shaped nanowhiskers, or a combination of organic and inorganic fiber shaped nanowhiskers; wherein the organic fiber shaped nanowhiskers, inorganic fiber shaped nanowhiskers, or a combination thereof, are modified, such as encapsulated or functionalized, to enhance compatibility with the ink vehicle, wherein the colorant and the organic fiber shaped nanowhiskers, the inorganic fiber shaped nanowhiskers, or combination of organic and inorganic fiber shaped nanowhiskers are substantially resistant to aggregation and settling. See, for example, U.S. Pat. Nos. 7,279,587; 7,276,614; 7,271,284; and 7,259,275, which are hereby incorporated by reference herein. See also, U.S. Patent Publications 20080000384A1; 20070283846A1; 20070211110A1; 20070142492A1; 20070123724A1; 20070123723A1; 20070123722A1; 20070123663A1; 20070123642A1; 2007012364A1; 20070123606A1; 20070123601A1; 20070120925A1; 20070120910A1; 20070120909A1; and 20060159850A1; which are each hereby totally incorporated by reference herein.

The phase change ink compositions herein further optionally contain a low molecular weight photoinitiator. See U.S. Patent Application for example U.S. patent application Ser. No. 11/893,072, of Jennifer L. Belelie and Marcel P. Breton, entitled "Phase Change Ink Compositions" filed Aug. 14, 2007, which is hereby incorporated by reference herein in its entirety. Examples of specific initiators include, but are not limited to, Irgacure® 127, Irgacure® 379, Irgacure® 819, all commercially available from Ciba Specialty Chemicals, among others.

Optionally, the low molecular weight photoinitiator is present in the phase change ink in any desired or effective amount, in one embodiment at least about 0.5 percent by weight of the ink composition, and in another embodiment at least about 1 percent by weight of the ink composition, and in one embodiment no more than about 5 percent by weight of the ink composition, and in another embodiment no more than about 2.5 percent by weight of the ink composition, although the amount can be outside of these ranges.

In embodiments, the phase change ink can optionally contain a curable wax component that is miscible with the other components and that will polymerize with the curable monomer to form a polymer. Inclusion of the wax promotes an increase in viscosity of the ink as it cools from the jetting temperature.

Suitable examples of waxes include, but are not limited to, those that are functionalized with curable groups. The curable groups may include, but are not limited to, acrylate, methacrylate, alkene, allylic ether, epoxide and oxetane. These waxes can be synthesized by the reaction of a wax equipped with a transformable functional group, such as carboxylic acid or hydroxyl.

Suitable examples of hydroxyl-terminated polyethylene waxes that may be functionalized with a curable group include, but are not limited to, mixtures of carbon chains with the structure $CH_3—(CH_2)_n—CH_2OH$, where there is a mixture of chain lengths, n, where the average chain length is in selected embodiments in the range of about 16 to about 50, and linear low molecular weight polyethylene, of similar average chain length. Suitable examples of such waxes include, but are not limited to, UNILIN® 350, UNILIN® 425, UNILIN® 550 and UNILIN® 700 with Mn approximately equal to 375, 460, 550 and 700 g/mol, respectively. All of these waxes are commercially available from Baker-Petrolite. Guerbet alcohols, characterized as 2,2-dialkyl-1-ethanols, are also suitable compounds. Specific embodiments of Guerbet alcohols include those containing 16 to 36 carbons, many of which are commercially available from Jarchem Industries Inc., Newark, N.J. In embodiments, PRIPOL® 2033 is selected, PRIPOL® 2033 being a C-36 dimer diol mixture including isomers of the formula

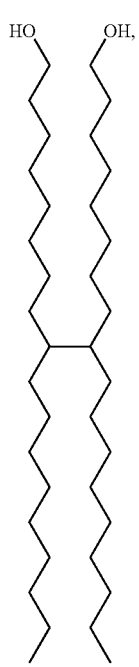

as well as other branched isomers which may include unsaturations and cyclic groups, available from Uniqema, New Castle, Del. Further information on C36 dimer diols of this type is disclosed in, for example, "Dimer Acids," Kirk-Othmer Encyclopedia of Chemical Technology, Vol. 8, 4th Ed. (1992), pp. 223 to 237, the disclosure of which is totally incorporated herein by reference. These alcohols can be reacted with carboxylic acids equipped with UV curable moieties to form reactive esters. Examples of these acids include, but are not limited to, acrylic and methacrylic acids, available from Sigma-Aldrich Co. Specific curable monomers include acrylates of UNILIN® 350, UNILIN® 425, UNILIN® 550 and UNILIN® 700.

Suitable examples of carboxylic acid-terminated polyethylene waxes that may be functionalized with a curable group include, but are not limited to, mixtures of carbon chains with the structure $CH_3—(CH_2)_n—COOH$, where there is a mixture of chain lengths, n, where the average chain length is in selected embodiments in the range of about 16 to about 50, and linear low molecular weight polyethylene, of similar average chain length. Suitable examples of such waxes include, but are not limited to, UNICID® 350, UNICID® 425, UNICID® 550 and UNICID® 700 with Mn equal to approximately 390, 475, 565 and 720 g/mol, respectively. Other suitable waxes have a structure $CH_3—(CH_2)_n—COOH$, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid, with n=31, tetratriacontanoic or geddic acid with n=32, pentatriacontanoic or ceroplastic acid with n=33. Guerbet acids, characterized as 2,2-dialkyl ethanoic acids, are also suitable compounds. Selected Guerbet acids include those containing 16 to 36 carbons, many of which are commercially available from Jarchem Industries Inc., Newark, N.J. PRIPOL® 1009 (C-36 dimer acid mixture including isomers of the formula

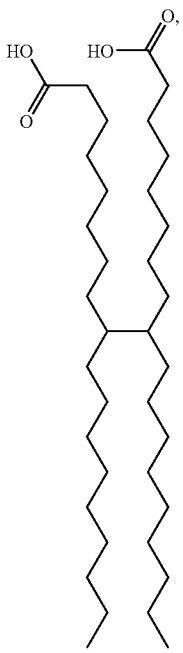

as well as other branched isomers which may include unsaturations and cyclic groups, available from Uniqema, New Castle, Del.; further information on C36 dimer acids of this type is disclosed in, for example, "Dimer Acids," Kirk-Othmer Encyclopedia of Chemical Technology, Vol. 8, 4th Ed. (1992), pp. 223 to 237, the disclosure of which is totally incorporated herein by reference, can also be used. These carboxylic acids can be reacted with alcohols equipped with UV curable moieties to form reactive esters. Examples of these alcohols include, but are not limited to, 2-allyloxyethanol from Sigma-Aldrich Co.;

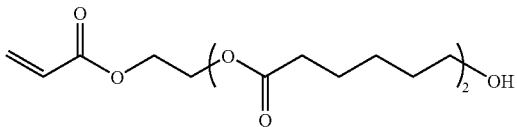

SR495B from Sartomer Company, Inc.;

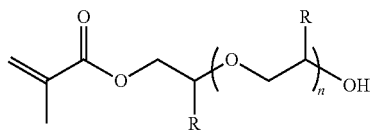

CD572 (R=H, n=10) and SR604 (R=Me, n=4) from Sartomer Company, Inc.

In embodiments, the optional curable wax is included in the ink in an amount of from, for example, about 1 to about 25% by weight of the ink, or from about 2 to about 20% by weight of the ink, or from about 2.5 to about 15% by weight of the ink, although the amounts can be outside of these ranges.

In further embodiments, the curable monomer or prepolymer and curable wax together can form more than about 50% by weight of the ink, or at least 70% by weight of the ink, or at least 80% by weight of the ink, although not limited.

The ink vehicles disclosed herein can comprise any suitable curable monomer or prepolymer. Examples of suitable materials include radically curable monomer compounds, such as acrylate and methacrylate monomer compounds, which are suitable for use as phase change ink carriers. Specific examples of relatively nonpolar acrylate and methacrylate monomers include (but are not limited to) isobornyl acrylate, isobornyl methacrylate, lauryl acrylate, lauryl methacrylate, isodecylacrylate, isodecylmethacrylate, caprolactone acrylate, 2-phenoxyethyl acrylate, isooctylacrylate, isooctylmethacrylate, butyl acrylate, and the like, as well as mixtures and combinations thereof. In addition, multifunctional acrylate and methacrylate monomers and oligomers can be included in the phase change ink carrier as reactive diluents and as materials that can increase the crosslink density of the cured image, thereby enhancing the toughness of the cured images. Examples of suitable multifunctional acrylate and methacrylate monomers and oligomers include (but are not limited to) pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxy ethyl) isocyanurate triacrylate, propoxylated neopentyl glycol diacrylate (available from Sartomer Co. Inc. as SR 9003), hexanediol diacrylate, tripropylene glycol diacrylate, dipropylene glycol diacrylate, amine modified polyether acrylates (available as PO 83 F, LR 8869, and/or LR 8889 (all available from BASF Corporation), trimethylolpropane triacrylate, glycerol propoxylate triacrylate, dipentaerythritol pentaacrylate, dipentaerythritol hexaacrylate, ethoxylated pentaerythritol tetraacrylate (available from Sartomer Co. Inc. as SR 494), and the like, as well as mixtures and combinations thereof. When a reactive diluent is added to the ink carrier material, the reactive diluent is added in any desired or effective amount, in one embodiment at least about 1 percent by weight of the carrier, and in another embodiment at least about 35 percent by weight of the carrier, and in one embodiment no more than about 80 percent by weight of the carrier, and in another embodiment no more than about 70 percent by weight of the carrier, although the amount of diluent can be outside of these ranges.

In embodiments, the ink vehicles contain at least one compound that can exhibit gel-like behavior in that it undergoes a relatively sharp increase in viscosity over a relatively narrow temperature range when dissolved in a liquid such as those compounds that behave as curable monomers when exposed to radiation such as ultraviolet light. One example of such a liquid curable monomer is a propoxylated neopentyl glycol diacrylate such as SR9003, commercially available from Sartomer Co. Inc.

In one embodiment, some compounds as disclosed herein undergo a change in viscosity of at least about $10^3$ centipoise, in another embodiment at least about $10^5$ centipoise, and in yet another embodiment at least about $10^6$ centipoise over a temperature range of in one embodiment at least about 30° C., in another embodiment at least about 10° C., and in yet another embodiment at least about 5° C., although the viscosity change and temperature range can be outside of these ranges, and compounds that do not undergo changes within these ranges are also included herein.

At least some embodiments of the compounds disclosed herein can form a semi-solid gel at a first temperature. For example, when the compound is incorporated into a phase change ink, this temperature is below the specific temperature at which the ink is jetted. The semi-solid gel phase is a physical gel that exists as a dynamic equilibrium comprising one or more solid gellant molecules and a liquid solvent. The semi-solid gel phase is a dynamic networked assembly of molecular components held together by non-covalent interactions such as hydrogen bonding, Van der Waals interactions, aromatic non-bonding interactions, ionic or coordination bonding, London dispersion forces, or the like, which, upon stimulation by physical forces, such as temperature, mechanical agitation, or the like, or chemical forces, such as pH, ionic strength, or the like, can undergo reversible transitions from liquid to semi-solid state at the macroscopic level. The solutions containing the gellant molecules exhibit a thermally reversible transition between the semi-solid gel state and the liquid state when the temperature is varied above or below the gel point of the solution. This reversible cycle of transitioning between semi-solid gel phase and liquid phase can be repeated many times in the solution formulation.

Any suitable gellant can be used for the ink vehicles disclosed herein. In embodiments, a gellant such as described in U.S. patent application Ser. No. 11/290,202, filed Nov. 30, 2005, entitled "Phase Change Inks Containing Photoinitiator With Phase Change Properties and Gellant Affinity," with the named inventors Peter G. Odell, Eniko Toma, and Jennifer L. Belelie, the disclosure of which is totally incorporated herein by reference, can be used, wherein the gellant is a compound of the formula

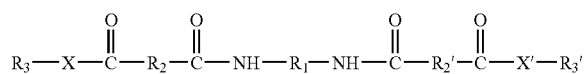

wherein $R_1$ is:
(i) an alkylene group (wherein an alkylene group is defined as a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group), in one embodiment with at least 1 carbon atom, and in one embodiment with no more than about 12 carbon atoms, in another embodiment with no more than about 4 carbon atoms, and in yet another embodiment with no more than about 2 carbon atoms, although the number of carbon atoms can be outside of these ranges,
(ii) an arylene group (wherein an arylene group is defined as a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group), in one embodiment with at least about 5 carbon atoms, and in another embodiment with at least about 6 carbon atoms, and in one embodiment with no more than about 14 carbon atoms, in another embodiment with no more than about 10 carbon atoms, and in yet another embodiment with no more than about 6 carbon atoms, although the number of carbon atoms can be outside of these ranges,
(iii) an arylalkylene group (wherein an arylalkylene group is defined as a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group), in one embodiment with at least about 6 carbon atoms, and in another embodiment with at least about 7 carbon atoms, and in one embodiment with no more than about 32 carbon atoms, in another embodiment with no more than about 22 carbon atoms, and in yet another embodiment with no more than about 7 carbon atoms, although the number of carbon atoms can be outside of these ranges, or
(iv) an alkylarylene group (wherein an alkylarylene group is defined as a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group), in one embodiment with at least about 6 carbon atoms, and in another embodiment with at least about 7 carbon atoms, and in one embodiment with no more than about 32 carbon atoms, in another embodiment with no more than about 22 carbon atoms, and in yet another embodiment with no more than about 7 carbon atoms, although the number of carbon atoms can be outside of these ranges, wherein the substituents on the substituted alkylene, arylene, arylalkylene, and alkylarylene groups can be (but are not limited to) halogen atoms, cyano groups, pyridine groups, pyridinium groups, ether groups, aldehyde groups, ketone groups, ester groups, amide groups, carbonyl groups, thiocarbonyl groups, sulfide groups, nitro groups, nitroso groups, acyl groups, azo groups, urethane groups, urea groups, mixtures thereof, and the like, wherein two or more substituents can be joined together to form a ring;

$R_2$ and $R_2'$ each, independently of the other, are:
(i) alkylene groups (wherein an alkylene group is defined as a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group), in one embodiment with at least 1 carbon atom, and in one embodiment with no more than about 54 carbon atoms, and in another embodiment with no more than about 36 carbon atoms, although the number of carbon atoms can be outside of these ranges,
(ii) arylene groups (wherein an arylene group is defined as a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group), in one embodiment with at least about 5 carbon atoms, and in another embodiment with at least about 6 carbon atoms, and in one embodiment with no more than about 14 carbon atoms, in another embodiment with no more than about 10 carbon atoms, and in yet another embodiment with no more than about 7 carbon atoms, although the number of carbon atoms can be outside of these ranges, (iii) arylalkylene groups (wherein an arylalkylene group is defined as a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group), in one embodiment with at least about 6 carbon atoms, and in another embodiment with at least about 7 carbon atoms, and in one embodiment with no more than about 32 carbon atoms, in another embodiment with no more than about 22 carbon atoms, and in yet another embodiment with no more than about 8 carbon atoms, although the number of carbon atoms can be outside of these ranges, or (iv) alkylarylene groups (wherein an alkylarylene group is defined as a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group), in one embodiment with at least about 6 carbon atoms, and in another embodiment with at least about 7 carbon atoms, and in one embodiment with no more than about 32 carbon atoms, in another embodiment with no more than about 22 carbon atoms, and in yet another embodiment with no more than about 7 carbon atoms, although the number of carbon atoms can be outside of these ranges, wherein the substituents on the substituted alkylene, arylene, arylalkylene, and alkylarylene groups can be (but are not limited to) halogen atoms, cyano groups, ether groups, aldehyde groups, ketone groups, ester groups, amide groups, carbonyl groups, thiocarbonyl groups, phosphine groups, phosphonium groups, phosphate groups, nitrile groups, mercapto groups, nitro groups, nitroso groups, acyl groups, acid anhydride groups, azide groups, azo groups, cyanato groups, urethane groups, urea groups, mixtures thereof, and the like, wherein two or more substituents can be joined together to form a ring;

$R_3$ and $R_3'$ each, independently of the other, are either:

(a) photoinitiating groups, such as groups derived from 1-(4-(2-hydroxyethoxy)phenyl)-2-hydroxy-2-methylpropan-1-one, of the formula

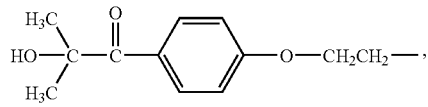

groups derived from 1-hydroxycyclohexylphenylketone, of the formula

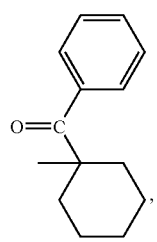

groups derived from 2-hydroxy-2-methyl-1-phenylpropan-1-one, of the formula

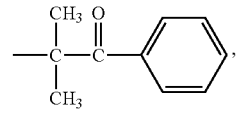

groups derived from N,N-dimethylethanolamine or N,N-dimethylethylenediamine, of the formula

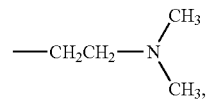

or the like, or:

(b) a group which is:

(i) an alkyl group (including linear and branched, saturated and unsaturated, cyclic and acyclic, and substituted and unsubstituted alkyl groups, and wherein heteroatoms, such as oxygen, nitrogen, sulfur, silicon, phosphorus, boron, and the like either may or may not be present in the alkyl group), in one embodiment with at least about 2 carbon atoms, in another embodiment with at least about 3 carbon atoms, and in yet another embodiment with at least about 4 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, (ii) an aryl group (including substituted and unsubstituted aryl groups, and wherein heteroatoms, such as oxygen, nitrogen, sulfur, silicon, phosphorus, boron, and the like either may or may not be present in the aryl group), in one embodiment with at least about 5 carbon atoms, and in another embodiment with at least about 6 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, such as phenyl or the like, (iii) an arylalkyl group (including substituted and unsubstituted arylalkyl groups, wherein the alkyl portion of the arylalkyl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkyl group), in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, such as benzyl or the like, or (iv) an alkylaryl group (including substituted and unsubstituted alkylaryl groups, wherein the alkyl portion of the alkylaryl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylaryl group), in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, such as tolyl or the like, wherein the substituents on the substituted alkyl, arylalkyl, and alkylaryl groups can be (but are not limited to) halogen atoms, ether groups, aldehyde groups, ketone groups, ester groups, amide groups, carbonyl groups, thiocarbonyl groups, sulfide groups, phosphine groups, phosphonium groups, phosphate groups, nitrile groups, mercapto groups, nitro groups, nitroso groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring;

provided that at least one of $R_3$ and $R_3'$ is a photoinitiating group;

and X and X' each, independently of the other, is an oxygen atom or a group of the formula $-NR_4-$, wherein $R_4$ is:

(i) a hydrogen atom;

(ii) an alkyl group, including linear and branched, saturated and unsaturated, cyclic and acyclic, and substituted and unsubstituted alkyl groups, and wherein heteroatoms either may or may not be present in the alkyl group, in one embodiment with at least 1 carbon atom, and in one embodiment with no more than about 100 carbon atoms, in another embodiment with no more than about 60 carbon atoms, and in yet another embodiment with no more than about 30 carbon atoms, although the number of carbon atoms can be outside of these ranges, (iii) an aryl group, including substituted and unsubstituted aryl groups, and wherein heteroatoms either may or may not be present in the aryl group, in one embodiment with at least about 5 carbon atoms, and in another embodiment with at least about 6 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, (iv) an arylalkyl group, including substituted and unsubstituted arylalkyl groups, wherein the alkyl portion of the arylalkyl group can be linear or branched, saturated or unsaturated, and cyclic or acyclic, and wherein heteroatoms either may or may not be present in either the aryl or the alkyl portion of the arylalkyl group, in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, or (v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, wherein the substituents on the substituted alkyl, aryl, arylalkyl, and alkylaryl groups can be (but are not limited to) halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring.

In one specific embodiment, $R_2$ and $R_2'$ are the same as each other; in another specific embodiment, $R_2$ and $R_2'$ are different from each other. In one specific embodiment, $R_3$ and $R_3'$ are the same as each other; in another specific embodiment, $R_3$ and $R_3'$ are different from each other.

In one specific embodiment, $R_2$ and $R_2'$ are each groups of the formula $-C_{34}H_{56+a}-$ and are branched alkylene groups which may include unsaturations and cyclic groups, wherein $a$ is an integer of 0, 1, 2, 3, 4, 5, 6, 7, 8, 9, 10, 11, or 12, including (but not limited to) isomers of the formula

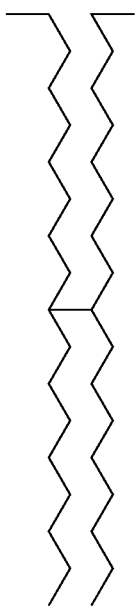

In one specific embodiment, $R_1$ is an ethylene ($-CH_2CH_2-$) group.

In one specific embodiment, $R_3$ and $R_3'$ are both

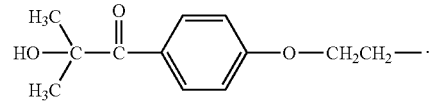

In one specific embodiment, the compound is of the formula

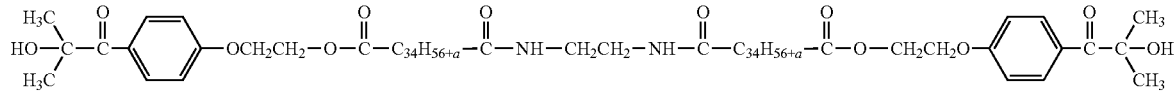

wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12, including (but not limited to) isomers of the formula

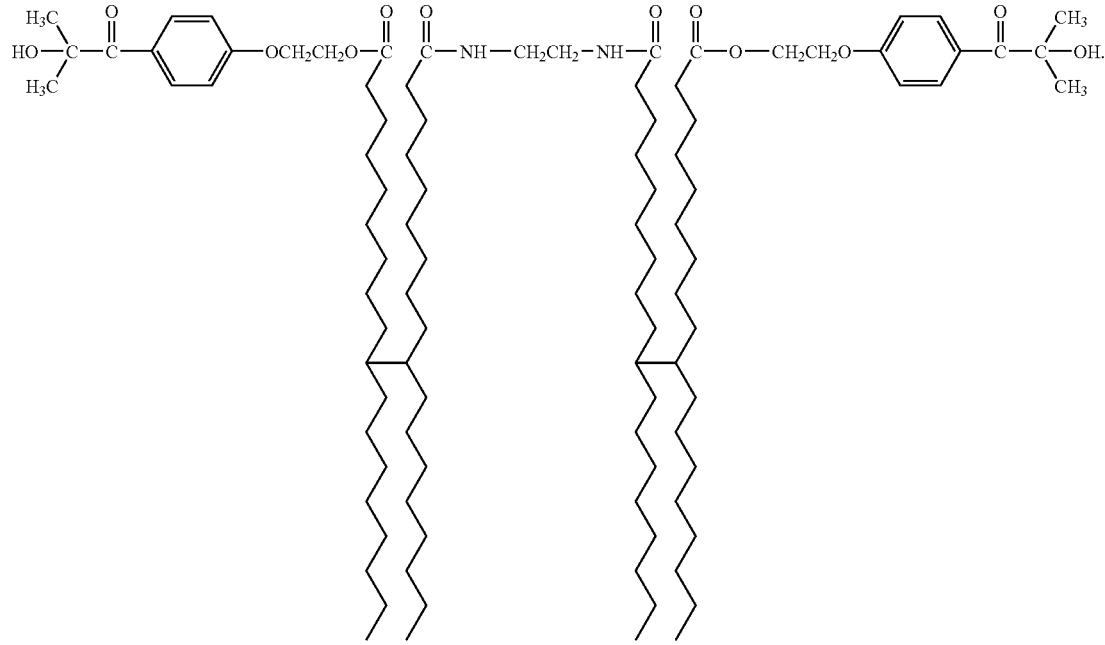 [SMILES: CCCCCCCCC(CCCCCCCCC(=O)NCCNC(=O)CCCCCCCCC(CCCCCCCC)C(CCCCCCCC)CCCCCCCCC(=O)OCCOc1ccc(C(=O)C(C)(C)O)cc1)C(CCCCCCCC)CCCCCCCCC(=O)OCCOc1ccc(C(=O)C(C)(C)O)cc1]

Additional specific examples of compounds of this formula include those of the formula

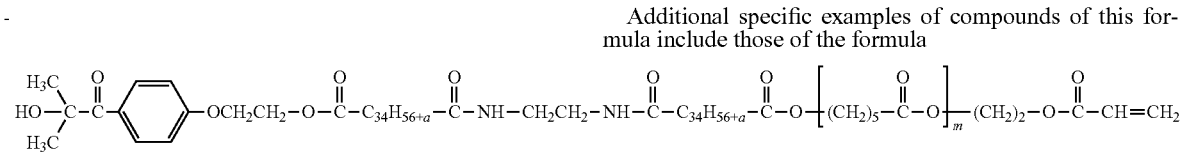

wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein m is an integer, including but not limited to embodiments wherein m is 2, including (but not limited to) isomers of the formula

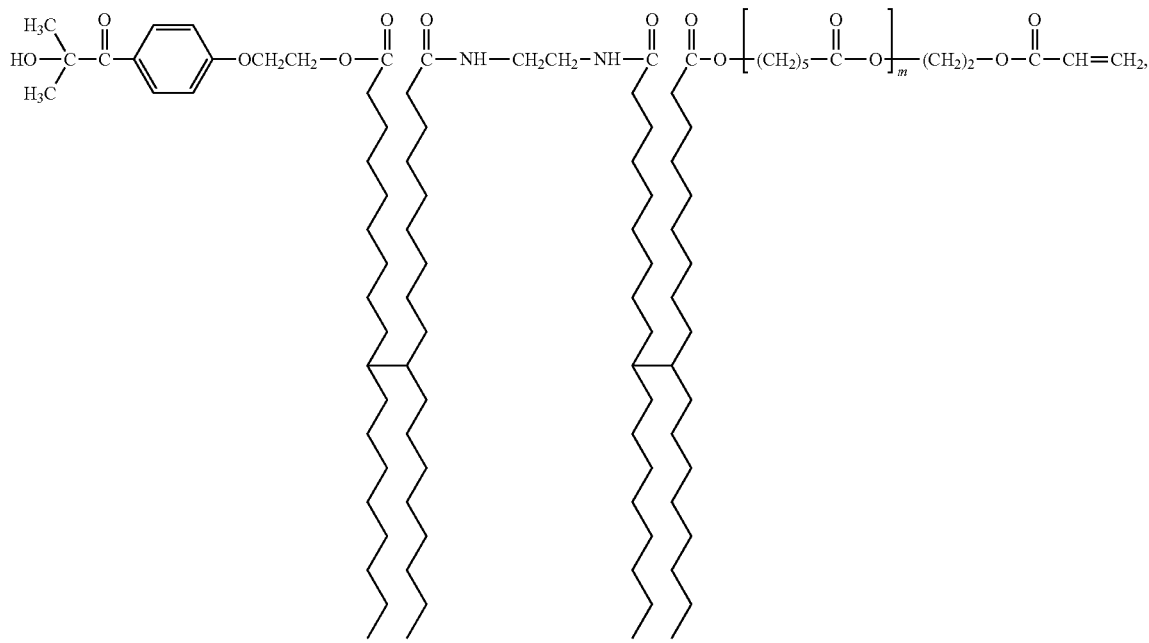

those of the formula

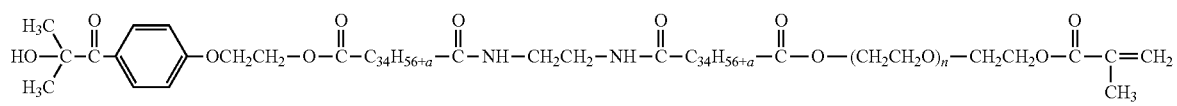

wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein n is an integer, including but not limited to embodiments wherein n is 2 and wherein n is 5, including (but not limited to) isomers of the formula

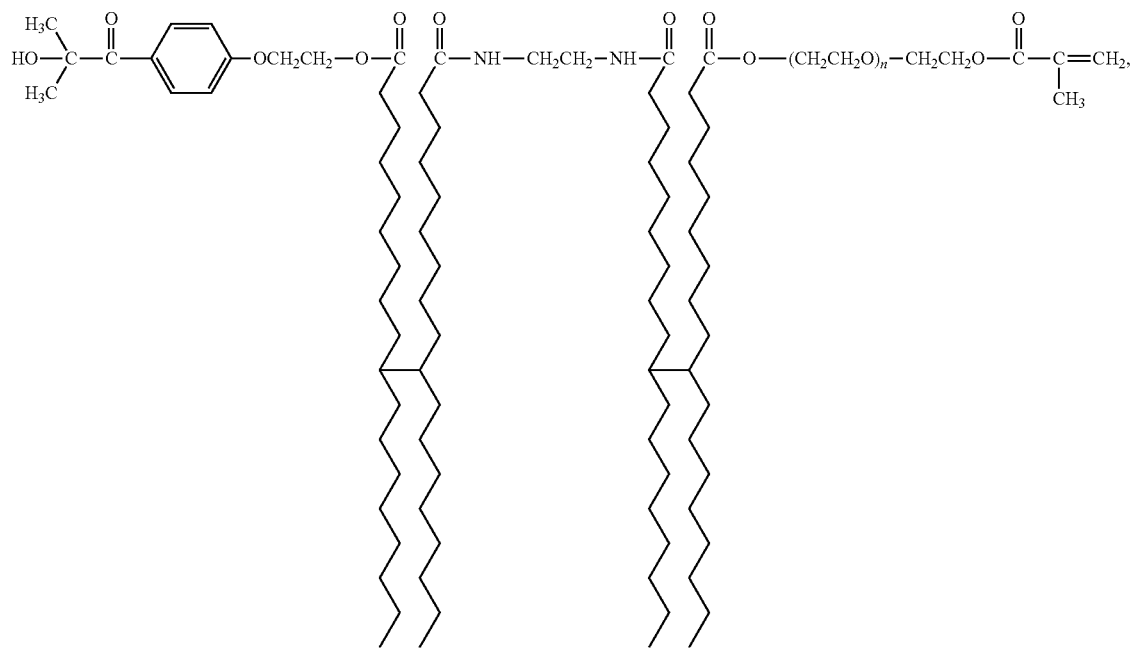

those of the formula

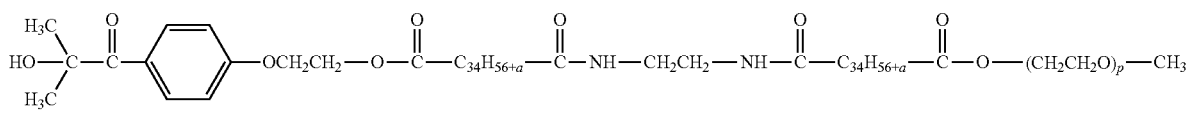

wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein p is an integer, including but not limited to embodiments wherein p is 2 and wherein p is 3, including (but not limited to) isomers of the formula

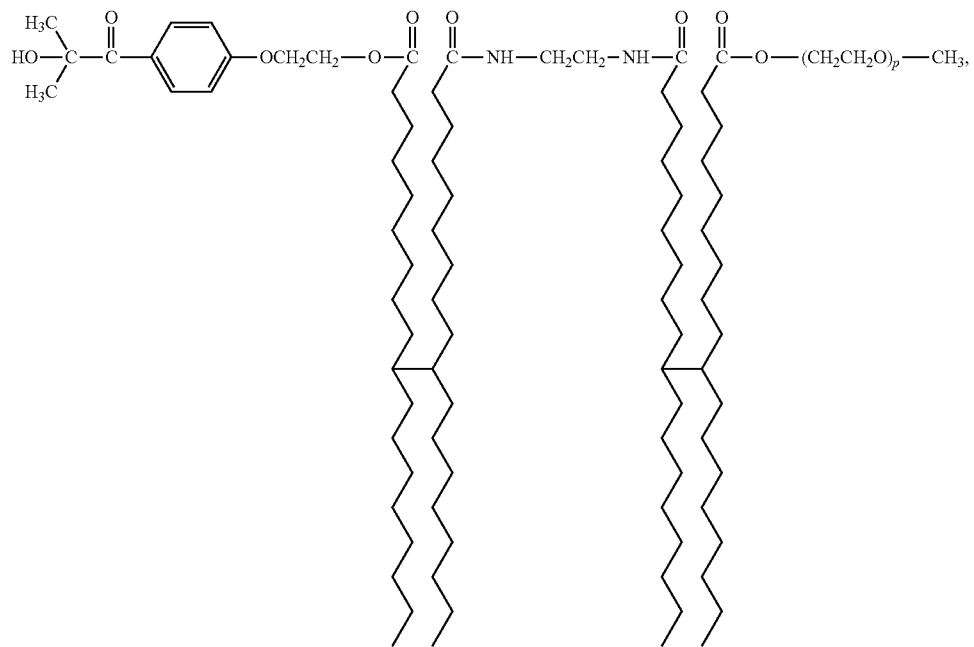
those of the formula
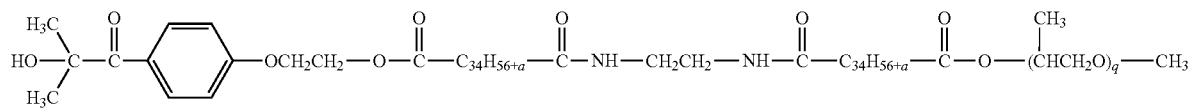
wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein q is an integer, including but not limited to embodiments wherein q is 2 and wherein q is 3, including (but not limited to) isomers of the formula
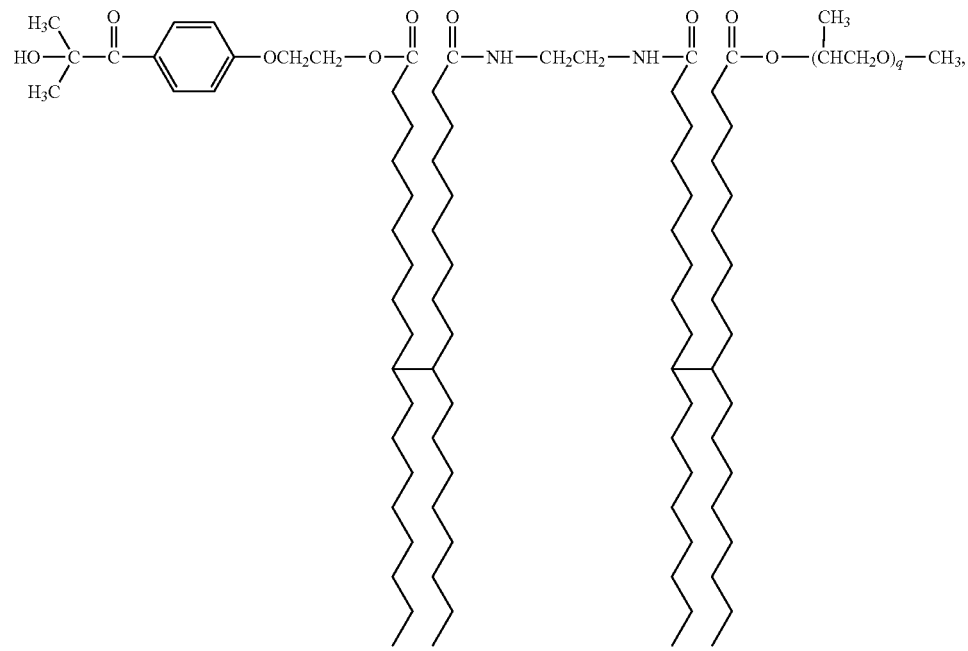

those of the formula

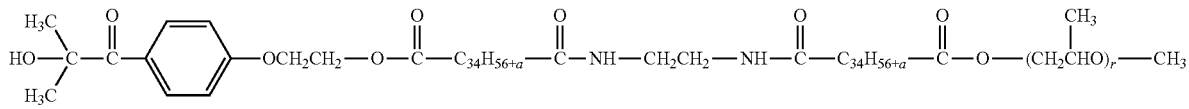

wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein r is an integer, including but not limited to embodiments wherein r is 2 and wherein r is 3, including (but not limited to) isomers of the formula

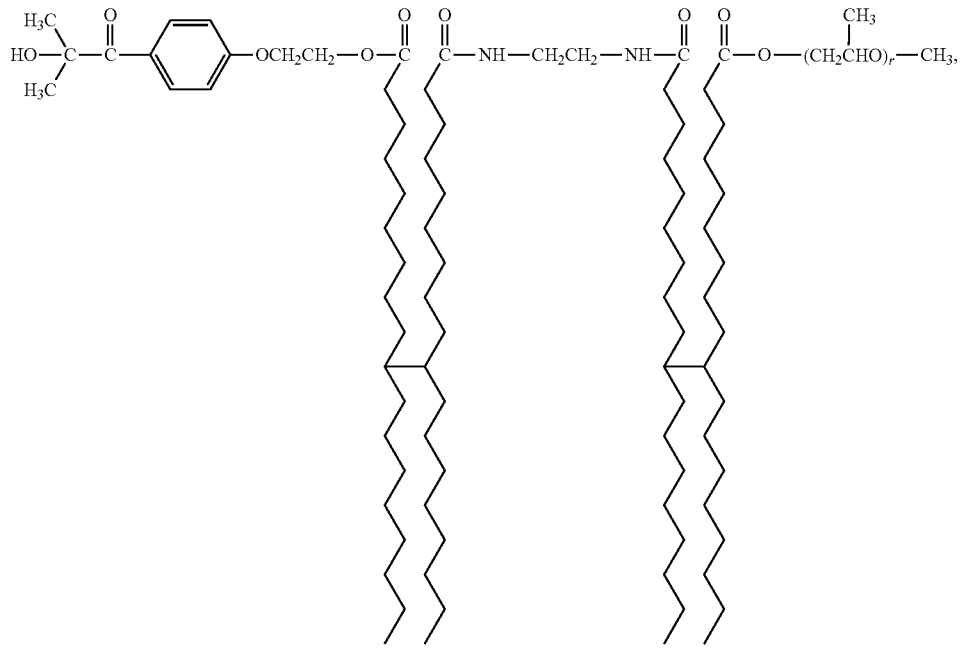

and the like, as well as mixtures thereof.

In embodiments, gellants herein can comprise materials disclosed in copending application U.S. Ser. No. 11/290,121, filed Nov. 30, 2005, entitled "Phase Change Inks Containing Curable Amide Gellant Compounds," with the named inventors Eniko Toma, Jennifer L. Belelie, and Peter G. Odell, the disclosure of which is totally incorporated herein by reference, including a compound of the formula

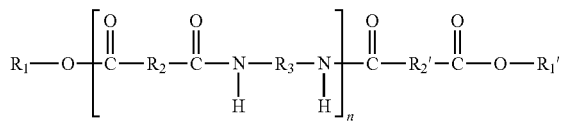

wherein $R_1$ and $R_1'$ each, independently of the other, is an alkyl group having at least one ethylenic unsaturation, an arylalkyl group having at least one ethylenic unsaturation, or an alkylaryl group having at least one ethylenic unsaturation, $R_2$, $R_2'$, and $R_3$ each, independently of the others, are alkylene groups, arylene groups, arylalkylene groups, or alkylarylene groups, and n is an integer representing the number of repeat amide units and is at least 1.

The gellant compounds as disclosed herein can be prepared by any desired or effective method.

For example, in embodiments, gellants can be prepared as described in copending application U.S. Ser. No. 11/290,328, filed Nov. 30, 2005, entitled "Method for Preparing Curable Amide Gellant Compounds," with the named inventors Jennifer L. Belelie, Adela Goredema, Peter G. Odell, and Eniko Toma, and the disclosure of which is totally incorporated herein by reference, which describes a process for preparing a compound of the formula

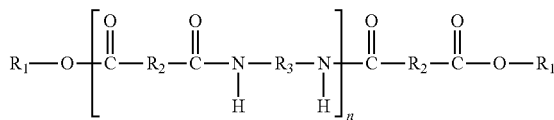

wherein $R_1$ is an alkyl group having at least one ethylenic unsaturation, an arylalkyl group having at least one ethylenic unsaturation, or an alkylaryl group having at least one ethylenic unsaturation, $R_2$ and $R_3$ each, independently of the others, are alkylene groups, arylene groups, arylalkylene groups, or alkylarylene groups, and n is an integer representing the number of repeat amide units and is at least 1, said process comprising: (a) reacting a diacid of the formula

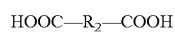

with a diamine of the formula

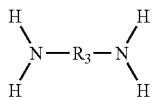

in the absence of a solvent while removing water from the reaction mixture to form an acid-terminated oligoamide intermediate; and (b) reacting the acid-terminated oligoamide intermediate with a monoalcohol of the formula

in the presence of a coupling agent and a catalyst to form the product.

The phase change ink compositions also contain a colorant. Any desired or effective colorant can be employed, including dyes, pigments, mixtures thereof, and the like, provided that the colorant can be dissolved or dispersed in the ink vehicle. The phase change carrier compositions can be used in combination with conventional phase change ink colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Eastman Olefin, Usharect Blue 86 (Direct Blue 86), available from Ushanti Color; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF, available from Clariant; Carta Blue 2GL, available from Clariant; metal phthalocyanine colorants such as those disclosed in U.S. Pat. No. 6,221,137, the disclosure of which is totally incorporated herein by reference and the like. Particularly suitable are solvent dyes; within the class of solvent dyes, spirit soluble dyes are desired because of their compatibility with the ink vehicles of the present invention. Examples of suitable spirit solvent dyes include Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), and the like. Neozapon Black X51 (C.I. Solvent Black, C.I. 12195) (BASF), Sudan Blue 670 (C.I. 61554) (BASF), Sudan Yellow 146 (C.I. 12700) (BASF), Sudan Red 462 (C.I. 260501) (BASF), Olefin dyes (Eastman Chemical Company), and Neopen Blue 808 (BASF), are particularly suitable in some embodiments. Polymeric dyes can also be used, such as those disclosed in, for example, U.S. Pat. No. 5,621,022 and U.S. Pat. No. 5,231,135, the disclosures of each of which are totally incorporated herein by reference, and commercially available from, for example, Milliken & Company as Milliken Ink Yellow 12, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

Pigments are also suitable colorants for the phase change inks. Examples of suitable pigments include Paliogen Violet 5100 (BASF); Paliogen Violet 5890 (BASF); Heliogen Green L8730 (BASF); Lithol Scarlet D3700 (BASF); Sunfast Blue 15:4 (Sun Chemical 249-0592); Hostaperm Blue B2G-D (Clariant); Permanent Red P-F7RK; Hostaperm Violet BL (Clariant); Pigment Red 202 (Bayer); Lithol Scarlet 4440 (BASF); Bon Red C (Dominion Color Company); Oracet Pink RF (Ciba); Paliogen Red 3871 K (BASF); Sunfast Blue 15:3 (Sun Chemical 249-1284); Paliogen Red 3340 (BASF); Sunfast Carbazole Violet 23 (Sun Chemical 246-1670); Lithol Fast Scarlet L4300 (BASF); Sunbrite Yellow 17 (Sun Chemical 275-0023); Heliogen Blue L6900, L7020 (BASF); Sunbrite Yellow 74 (Sun Chemical 272-0558); Spectra Pac C Orange 16 (Sun Chemical 276-3016); Heliogen Blue K6902, K6910 (BASF); Sunfast Magenta 122 (Sun Chemical 228-0013); Heliogen Blue D6840, D7080 (BASF); Sudan Blue OS (BASF); Neopen Blue FF4012 (BASF); PV Fast Blue B2GO1 (Clariant); Irgalite Blue BCA (Ciba); Paliogen Blue 6470 (BASF); Sudan Orange G (Aldrich), Sudan Orange 220 (BASF); Paliogen Orange 3040 (BASF); Paliogen Yellow 152, 1560 (BASF); Lithol Fast Yellow 0991 K (BASF); Paliotol Yellow 1840 (BASF); Novoperm Yellow FGL (Clariant); Lumogen Yellow D0790 (BASF); Suco-Yellow L1250 (BASF); Suco-Yellow D1355 (BASF); Suco Fast Yellow D1 355, D1 351 (BASF); Hostaperm Pink E 02 (Clariant); Hansa Brilliant Yellow 5GX03 (Clariant); Permanent Yellow GRL 02 (Clariant); Permanent Rubine L6B 05 (Clariant); Fanal Pink D4830 (BASF); Cinquasia Magenta (Du Pont), Paliogen Black L0084 (BASF); Pigment Black K801 (BASF); and carbon blacks such as REGAL 330™ (Cabot), Carbon Black 5250, Carbon Black 5750 (Columbia Chemical), mixtures thereof and the like. Also suitable are the colorants disclosed in U.S. Pat. No. 6,472,523, U.S. Pat. No. 6,726,755, U.S. Pat. No. 6,476,219, U.S. Pat. Nos. 6,576,747, 6,713,614, U.S. Pat. No. 6,663,703, U.S. Pat. No. 6,755,902, U.S. Pat. No. 6,590,082, U.S. Pat. No. 6,696,552, U.S. Pat. No. 6,576,748, U.S. Pat. No. 6,646,111, U.S. Pat. No. 6,673,139, U.S. Pat. No. 6,958,406, and U.S. Pat. No. 7,053,227, the disclosures of each of which are totally incorporated herein by reference.

In embodiments, the colorant comprises carbon black. In embodiments, the colorant comprises cyan pigment, yellow pigment, magenta pigment, red pigment, blue pigment, green pigment, or a combination thereof.

In further embodiments, they dye can interact with the nanowhisker surface minimizing dye diffusion.

The colorant is present in the phase change ink in any desired or effective amount to obtain the desired color or hue, in one embodiment at least about 0.1% by weight of the ink, in another embodiment at least about 0.2% by weight of the ink, and in a further embodiment at least about 0.5% by weight of the ink, and in one embodiment equal to or less than about 30% by weight of the ink, in another embodiment equal to or less than about 20% by weight of the ink, and in a further embodiment equal to or less than about 10% by weight of the ink, although the amount can be outside of these ranges.

The ink compositions disclosed herein in one embodiment have melting points in one embodiment equal to or less than about 145° C., in another embodiment equal to or less than about 130° C., in another embodiment equal to or less than about 120° C., in a further embodiment equal to or less than about 110° C., and in still another embodiment equal to or less than about 100° C., although the melting point can be outside of these ranges.

The ink compositions prepared by the process disclosed herein generally have melt viscosities, at the jetting temperature which can be equal to or less than about 145° C., in one embodiment equal to or less than about 140° C., in another embodiment equal to or less than about 130° C., and in another embodiment equal to or less than about 120° C., in a further embodiment equal to or less than about 110° C., and in yet another embodiment equal to or less than about 80° C., although the jetting temperature can be outside of these ranges, which are in one embodiment equal to or less than about 30 centipoise (cps), in another embodiment equal to or less than about 25 cps, and in yet a further embodiment equal to or less than about 20 cps, and in another embodiment no less than about 2 cps, in a further embodiment no less than about 3 cps, and in yet a further embodiment no less than about 4 cps, although the melt viscosity can be outside of these ranges.

Showthrough is defined herein as the increase in paper OD (background subtracted) that results from the presence of a solid area image on the reverse side of the paper. With regard to the present inks, it is believed that show though can be substantially reduced so that the printed image in one embodiment is equal to or less than about 0.07 optical density units, in another embodiment is equal to or less than about 0.06 optical density units, in a further embodiment is equal to or less than about 0.05 optical density units, and in a yet further embodiment is equal to or less than about 0.04 optical density units, although the level of show through can be outside of these ranges.

The phase change ink compositions of the present disclosure can also optionally contain an antioxidant. The optional antioxidants of the ink compositions protect the images from oxidation and also protect the ink components from oxidation during the heating portion of the ink preparation process. Specific examples of suitable antioxidants include NAUGUARD® 524, NAUGUARD® 76, and NAUGUARD® 512, commercially available from Uniroyal Chemical Company, Oxford, Conn., IRGANOX® 1010, commercially available from Ciba Geigy, and the like. When present, the optional antioxidant is present in the ink in any desired or effective amount, in one embodiment of at least about 0.01 percent by weight of the ink, in another embodiment of at least about 0.1 percent by weight of the ink, and in yet another embodiment of at least about 1 percent by weight of the ink, and in one embodiment of no more than about 20 percent by weight of the ink, in another embodiment of no more than about 5 percent by weight of the ink, and in yet another embodiment of no more than about 3 percent by weight of the ink, although the amount can be outside of these ranges.

The phase change ink compositions of the present disclosure can also optionally contain a viscosity modifier. Examples of suitable viscosity modifiers include aliphatic ketones, such as stearone, and the like. When present, the optional viscosity modifier is present in the ink in any desired or effective amount, in one embodiment of at least about 0.1 percent by weight of the ink, in another embodiment of at least about 1 percent by weight of the ink, and in yet another embodiment of at least about 10 percent by weight of the ink, and in one embodiment of no more than about 99 percent by weight of the ink, in another embodiment of no more than about 30 percent by weight of the ink, and in yet another embodiment of no more than about 15 percent by weight of the ink, although the amount can be outside of these ranges.

Other optional additives to the inks include clarifiers, such as UNION CAMP® X37-523-235 (commercially available from Union Camp), in an amount in one embodiment of at least about 0.01 percent by weight of the ink, in another embodiment of at least about 0.1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA® KE-311 Resin, a triglyceride of hydrogenated abietic (rosin) acid (commercially available from Arakawa Chemical Industries, Ltd.), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Goodyear), and the like, in an amount in one embodiment of at least about 0.1 percent by weight of the ink, in another embodiment of at least about 5 percent by weight of the ink, and in yet another embodiment of at least about 10 percent by weight of the ink, and in one embodiment of no more than about 98 percent by weight of the ink, in another embodiment of no more than about 75 percent by weight of the ink, and in yet another embodiment of no more than about 50 percent by weight of the ink, although the amount can be outside of these range, adhesives, such as VERSAMID® 757, 759, or 744 (commercially available from Henkel), in an amount in one embodiment of at least about 0.1 percent by weight of the ink, in another embodiment of at least about 1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, plasticizers, such as UNIPLEX® 250 (commercially available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), triphenyl phosphate (commercially available from Monsanto), KP-140®, a tributoxyethyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), and the like, in an amount in one embodiment of at least about 0.1 percent by weight of the ink, in another embodiment of at least about 1 percent by weight of the ink, and in yet another embodiment of at least about 2 percent by weight of the ink, and in one embodiment of no more than about 50 percent by weight of the ink, in another embodiment of no more than about 30 percent by weight of the ink, and in yet another embodiment of no more than about 10 percent by weight of the ink, although the amount can be outside of these ranges, and the like.

The ink compositions of the present disclosure can be prepared by any desired or suitable method. For example, the ink ingredients can be mixed together, followed by heating, to a temperature in one embodiment of at least about 100° C., and in one embodiment of no more than about 140° C., although the temperature can be outside of these ranges, and stirring until a homogeneous ink composition is obtained, followed by cooling the ink to ambient temperature (typically from about 20 to about 25° C.). The inks of the present disclosure are solid at ambient temperature. In a specific embodiment, during the formation process, the inks in their molten state are poured into molds and then allowed to cool and solidify to form ink sticks.

The inks of the present disclosure can be employed in apparatus for direct printing ink jet processes and in indirect (offset) printing ink jet applications. Another embodiment of the present disclosure is directed to a process which comprises incorporating an ink of the present disclosure into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. In embodiments, the substrate is a final recording sheet and droplets of the melted ink are ejected in an imagewise pattern directly onto the final recording sheet. Yet another embodiment of the present disclosure is directed to a process which comprises incorporating an ink of the present disclosure into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. In embodiments, the intermediate transfer member is heated to a temperature above that of the final recording sheet and below that of the melted ink in the printing apparatus. Inks of the present disclosure can also be employed in other hot melt printing processes, such as hot melt acoustic ink jet printing, hot melt thermal ink jet printing, hot melt continuous stream or deflection ink jet printing, and the like. Phase change inks of the present disclosure can also be used in printing processes other than hot melt ink jet printing processes.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, Hammermill Laserprint Paper, and the like, transparency materials, fabrics, textile products, plastics, polymeric films, inorganic substrates such as metals and wood, and the like.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1

Preparation of pigment dispersion, Extrudate A: Triamide resin, (prepared as described in Example II of U.S. Pat. No. 6,860,930, which is incorporated by reference herein in its entirety) was processed through a blender to powder form. Thereafter, about 750.72 grams of the powderized triamide resin and about 239.7 grams of Nipex® 150 carbon black (obtained from Degussa Canada, Burlington, Ontario) were admixed in a LITTLEFORD M5 blender for about 30 minutes at 0.8 A. Subsequently, the powder mixture was added at a rate of 0.8 pounds per hour to a DAVO counter-rotating twin screw extruder (Model VS 104, from Deutsche Apparate-Vertrieborganisation GmbH & Co, Troisdorf, Germany). The contents in the extruder were then mixed at 70° C. at 50 RPM. The outlet temperature was set at 75° C. The extruded dispersion, Extrudate A, is melt-mixed with other ink ingredients to form an ink.

Example 2

Control

Extrudate A from Example one (13.13 weight (wt) %, about 19.70 grams) and Petrolite CA-11 diurethane dispersant (3.9 wt %, about 5.92 grams (g)) were weighed in a 250 milliliter beaker (A). Kemamide® 180 from Crompton Corp. (15.9 wt %, 22.79 g), KE100 resin from Arakawa Chemical Industries Ltd (10.85 wt %, about 16.28 grams), and Naugard® N445 from Crompton Corp. (0.12 wt %, about 0.18 grams) were weighed in a separate 250 milliliter beaker (B). Finally, polyethylene wax from Baker Petrolite (54.26 wt %, about 81.39 grams), and the urethane resin described in Example 4 of U.S. Pat. No. 6,309,453, which is incorporated by reference herein in its entirety), (2.5 wt %, about 3.74 grams) were weighed in a third 250 milliliter beaker (C). Beakers A, B, and C were placed in a 130° C. oven and heated (for approximately three hours). After two hours of heating, the components in beaker B were stirred with a heated spatula to aid in melting and dissolving the mixture, and this was repeated 30 minutes later. Once the mixture in beaker B was fully dissolved and melted, the contents in beaker B were poured into beaker A.

A Sonic Dismembrator Model 500 Sonifier was then used to sonify the ingredients in beaker A. The sonifier was programmed to sonify the ink for 30 seconds and then pause for 30 seconds, and to repeat this process five times, thus producing a total sonification process time of three minutes. While sonifying, the beaker was rotated to ensure even processing throughout the mixture with the temperature maintained below 130° C. Once the first three minute sonification process was completed on beaker A, the beaker was placed back in a 110° C. oven for 30 minutes. Subsequently, the same sonification process was repeated on the contents in beaker A. Thereafter, the contents in beaker C were gradually poured into beaker A throughout the first 30 second sonification interval of the third sonification process carried out on beaker A. The carbon black ink thus prepared exhibited a viscosity of about 10.8 centipoise (cps) as measured on an AR2000 Rheometer from TA Instruments. The ink was then filtered subsequently through a 1 micrometer (μm) and then a 0.45 μm glass fiber disc filter at 110° C. with an applied pressure of 15 pounds per square inch (psi) The final ink was then cooled to room temperature and tested on a Xerox® PHASER® 8400 piezo ink jet printer for weeping. The composition of this ink is shown in Table 1 below.

Example 3

Control

A carbon black ink was prepared as in ink Example 2 except that WB-5 diurethane dispersant (available from Baker Petrolite) was used in place of Petrolite CA-11 (available from Baker Petrolite). The composition of this ink is shown in Table 1 below

Example 4

Control

A carbon black ink was prepared as in ink example 2 except that WB-17 diurethane dispersant (available from Baker Petrolite) was used in place of Petrolite CA-11. The composition of this ink is shown in Table 1 below.

Example 5

Control

The following components were melted and stir-mixed in a 4 liter beaker (A) at 125° C.: Extrudate A of Example 1 (13.17 wt %, about 367.64 grams), Petrolite CA-11 (3.94 wt %, about 110.49 grams), Kemamide® S180 from Crompton Corp. (15.19 wt %, about 425.41 grams), KE100 resin from Arakawa Chemical Industries Ltd. (10.85 wt %, about 303.86 grams), and Naugard® N445 from Crompton Corp. (0.12 wt %, about 3.40 grams). Beaker (A) was equipped with a heating mantel and a mechanical stirrer. The carbon black dispersion was heated and stirred for an hour at 125° C. While the pigment dispersion was prepared in beaker (A), a different mixture was prepared in a separate beaker. In a 4 liter beaker (B) at 125° C. two ingredients were melt-mixed: Distilled polyethylene wax from Baker Petrolite (as described in U.S. Patent Publication 2007/0120916, the disclosure of which is totally incorporated herein by reference; 54.24 wt %, about 1,519.32 grams), and the urethane resin described in Example 4 of U.S. Pat. No. 6,309,453, incorporated by reference hereinabove, (2.53 wt %, about 70.80 grams). Beaker (B) was also equipped with a heating mantel and a mechanical stirrer. The resin dispersion in beaker (B) was heated and stirred for an hour to ensure that all resins were fully melt-mixed.

An IKA Ultra Turrax® T50 Homogenizer was then used to homogenize the ingredients in beaker (A) for 30 minutes with the temperature maintained at 125° C. during homogenization. The molten resin mixture in beaker (B), which was kept at 125° C. was then added into the homogenized pigment dispersion in beaker (A). The carbon black ink in beaker (A) was further homogenized for an additional 30 minutes and thereafter its rheology was measured using the AR2000 Rheometer. After filtering the resulting carbon black ink subsequently through a 1 μm and then a 0.45 μm glass fiber cartridge-filter at 115° C., the ink was cooled to room temperature. The final ink was then tested on a Xerox® Phaser 8860 piezo ink jet printer.

Example 6

NanoWhisker A. Functionalized alumina nanowhiskers are prepared using the nanowhiskers available from NanoCeram® as starting materials. The NanoCeram® materials are surface treated with 3-aminopropyl-triethoxysilane (3-APTES). 3-APTES is added to a 95 wt % ethanol/5 wt % deionized water solution with stirring to yield a 2 wt % concentration. To obtain hydrolysis and silanol formation, the above solution is kept for 5 minutes. The alumina nanowhiskers are then dipped into the hydrolysed solution, agitated gently, and removed after a few minutes. Alumina nanowhiskers are then rinsed free of excess materials by dipping briefly in ethanol. The surface-treated alumina nanowhiskers are allowed to stand at room temperature for 24 hours followed by heating at 100° C. for 6 hours, to remove the solvent and complete the curing. The above procedure is repeated to generate the amounts of alumina nanowhiskers required for making the inks of the present invention. For further details, see Miyagawa et al. in Ind. Eng. Chem. Res., 2004, 43, pp 7001-7009, which is incorporated by reference herein in its entirety. The nanowhiskers are rendered hydrophobic by grafting unto them an appropriate functionalized hydrocarbon, for example 3-aminopropyltriethoxysilane (3-APTES). The nanowhiskers are, in embodiments, surface treated such as with stearoyl chloride in dry chloroform or alternatively in 1,1,2 trichlorotrifluoroethane in presence of triethylamine. The particles are washed several times with ethanol, water and then dried. For further details, see D. Cunliffe et al. in Applied and Environmental Microbiology, November 1999, p. 4995-5002, for surfaces treated with 3-APTES, which is incorporated by reference herein in its entirety.

Example 7

Low Melt Carbon Black Pigmented Inks

Preparation of pigment dispersion, Extrudate B. Triamide resin, (prepared as described in Example II of U.S. Pat. No. 6,860,930, incorporated by reference hereinabove) is processed through a blender to powder form. Thereafter, about 750.72 grams of the powderized triamide resin, about 239.7 grams of Nipex® 150 carbon black (obtained from Degussa Canada, Burlington, Ontario) and about 71.91 grams of NanoWhisker A of Example 6, are admixed in a LITTLEFORD M5 blender for 30 minutes at 0.8 A. Subsequently, the powder mixture is added at a rate of 0.8 lbs./hr. to a DAVO counter-rotating twin screw extruder (Model VS 104, from Deutsche Apparate-Vertrieborganisation GmbH & Co, Troisdorf, Germany). The contents in the extruder are then mixed at 70° C. at 50 RPM. The outlet temperature is set at 75° C. The resulting extruded dispersion, Extrudate B, is used to formulate an embodiment of the ink of the present disclosure.

Preparation of pigment dispersion, Extrudate C. Triamide resin, (prepared as described in Example II of U.S. Pat. No. 6,860,930, incorporated by reference hereinabove) is processed through a blender to powder form. Thereafter, about 750.72 grams of the powderized triamide resin, about 239.7 grams of Nipex® 150 carbon black (obtained from Degussa Canada, Burlington, Ontario) and about 200.00 grams of NanoWhisker A of Example 6, are admixed in a LITTLEFORD M5 blender for 30 minutes at 0.8 A. Subsequently, the powder mixture is added at a rate of 0.8 lbs./hr. to a DAVO counter-rotating twin screw extruder (Model VS 104, from Deutsche Apparate-Vertrieborganisation GmbH & Co, Troisdorf, Germany). The contents in the extruder are then mixed at 70° C. at 50 RPM. The outlet temperature is set at 75° C. The resulting extruded dispersion, Extrudate C, is used to formulate an embodiment of the ink of the present disclosure.

Example 8

Low Energy Heterogeneous Carbon Black Pigmented Ink. Extrudate B (13.13 wt %, about 19.70 grams) and Petrolite CA-11 diurethane dispersant (3.95 wt %, about 5.92 grams) are weighed in a 250 milliliter beaker (A). Kemamide® S180 from Crompton Corp. (15.19 wt %, about 22.79 grams), KE100 resin from Arakawa Chemical Industries Ltd (10.85 wt %, about 16.28 grams), and Naugard® N445 from Crompton Corp. (0.12 wt %, about 0.18 grams) are weighed in a separate 250 milliliter beaker (B). Finally, polyethylene wax from Baker Petrolite (54.26 wt %, about 81.39 grams), and the urethane resin described in Example 4 of U.S. Pat. No. 6,309,453, incorporated by reference hereinabove, (2.5 wt %, about 3.74 grams) are weighed in a third 250 milliliter beaker (C). Beakers A, B, and C are placed in a 130° C. oven and heated (for approximately three hours). After two hours of heating, the components in beaker B are stirred with a heated spatula to aid in melting and dissolving the mixture, and this is repeated 30 minutes later. Once the mixture in beaker B is fully dissolved and melted, the contents in beaker B are poured into beaker A.

A Sonic Dismembrator Model 500 Sonifier is then used to sonify the ingredients in beaker A. The sonifier is programmed to sonify the ink for 30 seconds and then pause for 30 seconds, and to repeat this process five times, thus producing a total sonification process time of three minutes. While sonifying, the beaker is rotated to ensure even processing throughout the mixture with the temperature maintained below 130° C. Once the first three minute sonification process is completed on beaker A, the beaker is placed back in a 110° C. oven for 30 minutes. Subsequently, the same sonification process is repeated on the contents in beaker A. Thereafter, the contents in beaker C are gradually poured into beaker A throughout the first 30 second sonification interval of the third sonification process carried out on beaker A. The carbon black ink thus prepared exhibits a projected viscosity of about 11 cps as measured on an AR2000 rheometer from TA Instruments. This viscosity is estimated from the viscosity of inks not containing the present nanowhiskers, which viscosity is typically in the range of about 10 to about 11 cps at about 110 to about 140° C. If nanowhiskers are well dispersed, they are not expected to increase viscosity, in embodiments not expected to increase viscosity by more than about 10 to about 20 percent depending on the concentration used. For example, modeling is available to calculate viscosity of dispersions of non-spherical particles. For spherical particles, the viscosity can be calculated for example at about 2.5× (volume fraction of the sphere in vehicle) for an ideal system. The ink is then filtered subsequently through a 1 μm and then a 0.45 μm glass fiber disc filter at 110° C. with an applied pressure of 15 psi. The final ink is then cooled to room temperature and printed.

Example 9

A carbon black ink is prepared as in ink example 8 except that WB-5 dispersant is used in place of Petrolite CA-11. The composition of this ink is shown in Table 1 below.

Example 10

A carbon black ink is prepared as in ink example 8 except that WB-17 dispersant is used in place of Petrolite CA-11. The composition of this ink is shown in Table 1 below.

Example 11

The following components are melted and stir-mixed in a 4 liter beaker (A) at 125° C.: Extrudate C (13.13 wt %, about 367.64 grams), Petrolite CA-11 (3.94 wt %, about 110.49 grams), Kemamide® S180 from Crompton Corp. (15.19 wt %, about 425.41 grams), KE100 resin from Arakawa Chemical Industries Ltd. (10.85 wt %, about 303.86 grams), and Naugard® N445 from Crompton Corp. (0.12 wt %, about 3.40 grams). Beaker (A) is equipped with a heating mantel and a mechanical stirrer. The carbon black dispersion is heated and stirred for an hour at 125° C. While the pigment dispersion is prepared in beaker (A), a different mixture is prepared in a separate beaker. In a 4 liter beaker (B) at 125° C., two ingredients are melt-mixed: polyethylene wax from Baker Petrolite (54.24 wt %, about 1,519.32 grams), and the urethane resin described in Example 4 of U.S. Pat. No. 6,309,453, incorporated by reference hereinabove, (2.53 wt %, about 70.80 grams). Beaker (B) is also equipped with a heating mantel and a mechanical stirrer. The resin dispersion in beaker (B) is heated and stirred for an hour to ensure that all resins are fully melt-mixed.

An IKA Ultra Turrax® T50 Homogenizer is then used to homogenize the ingredients in beaker (A) for 30 minutes with the temperature maintained at 125° C. during homogenization. The molten resin mixture in beaker (B), which is kept at 125° C. is then added into the homogenized pigment dispersion in beaker (A). The carbon black ink in beaker (A) is further homogenized for an additional 30 minutes. After filtering the resulting carbon black ink subsequently through a 1 μm and then a 0.45 μm glass fiber cartridge-filter at 115° C., the ink is cooled to room temperature. The final ink is then printed using an ink jet printer.

Example 12

A carbon black ink is prepared as in ink Example 11 except that an additional 200 grams of Extrudate C is added to the ink after the final 30 minute homogenization step and the ink is homogenized for an additional 20 minutes. The composition of this ink is shown in Table 1 below.

Example 13

Organo-Whisker A. Polyethylene (PE) organo-whiskers are prepared. Crystalline organo-whiskers of ultrahigh molecular weight (greater than about 1 M and in embodiments about 6 M) and of from about 30 to about 50 nanometers in size are obtained. A melting point of about 140° C. is reported, well above the jetting temperature of low energy inks. The procedure is as follows. MAO (Al/Ti=1000) in toluene (20 milliliters) is added to a stainless steel autoclave (100 milliliters) containing dried $CP_2Ti$-MSF (50 mg; $3\times10-6$ mol Ti) in nitrogen environment. The mixture is stirred for 1 hour at 20° C. to produce a suspension that is pressurized by the introduction of ethylene and stirred magnetically under a constant pressure (10 atmospheres) at 20° C. After 4 hours, cocoon-like polymeric mass which has absorbed most of the solvent is picked out with tweezers from the autoclave and dipped in a large volume of benzene. The polymeric mass is freeze-dried to give 1.8 grams of colorless PE after stirring for 48 hours. The production rate of PE is estimated to be 15 kg mol-1 hour-1 bar-1. The resulting PE has an ultrahigh viscometric molecular weight (MV=6,200,000) and a higher density (1.01 g cm-3) and 13C nuclear magnetic resonance (NMR) spectrum of the PE confirms a linear sequence of the repeating ethylene units without any branch structures. For further detail, see Kageyama et al., in Science, Vol. 285, September 1999, pp 2113-2115, the disclosure of which is totally incorporated by reference herein.

Example 14

Low Melt Carbon Black Pigmented Inks

Preparation of pigment dispersion, Extrudate D. Triamide resin, (described in U.S. Pat. No. 6,860,930, incorporated by reference hereinabove) is processed through a blender to powder form. Thereafter, about 750.72 grams of the powderized triamide resin, about 239.7 grams of Nipex® 150 carbon black (obtained from Degussa Canada, Burlington, Ontario) and about 71.91 grams of OrganoWhisker A of Example 13, are admixed in a LITTLEFORD M5 blender for 30 minutes at 0.8 A. Subsequently, the powder mixture is added at a rate of about 0.8 lbs./hr. to a DAVO counter-rotating twin screw extruder (Model VS 104, from Deutsche Apparate-Vertrieborganisation GmbH & Co, Troisdorf, Germany). The contents in the extruder are then mixed at about 70° C. at about 50 RPM. The outlet temperature is set at about 75° C. The resulting extruded dispersion, Extrudate D, is used to formulate inks of the present disclosure.

Example 15

Low Energy Heterogeneous Carbon Black Pigmented Ink. Extrudate D (13.13 wt %, about 19.70 grams) and Petrolite CA-11 (3.95 wt %, about 5.92 grams) are weighed in a 250 milliliter beaker (A). Kemamide® S180 from Crompton Corp. (15.19 wt %, about 22.79 grams), KE100 resin from Arakawa Chemical Industries Ltd (10.85 wt %, about 16.28 grams), and Naugard® N445 from Crompton Corp. (0.12 wt %, about 0.18 grams) are weighed in a separate 250 milliliter beaker (B). Finally, polyethylene wax from Baker Petrolite (54.26 wt %, about 81.39 grams), and the urethane resin described in Example 4 of U.S. Pat. No. 6,309,453, incorporated by reference hereinabove, (2.5 wt %, about 3.74 grams) are weighed in a third 250 milliliter beaker (C). Beakers A, B, and C are placed in a 115° C. oven and heated (for approximately three hours). After two hours of heating, the components in beaker B are stirred with a heated spatula to aid in melting and dissolving the mixture, and this is repeated 30 minutes later. Once the mixture in beaker B is fully dissolved and melted, the contents in beaker B are poured into beaker A.

A Sonic Dismembrator Model 500 Sonifier is then used to sonify the ingredients in beaker A. The sonifier is programmed to sonify the ink for 30 seconds and then pause for 30 seconds, and to repeat this process five times, thus producing a total sonification process time of three minutes. While sonifying, the beaker is rotated to ensure even processing throughout the mixture with the temperature maintained below 115° C. Once the first three minute sonification process is completed on beaker A, the beaker is placed back in a 110° C. oven for 30 minutes. Subsequently, the same sonification process is repeated on the contents in beaker A. Thereafter, the contents in beaker C are gradually poured into beaker A throughout the first 30 second sonification interval of the third sonification process carried out on beaker A. The carbon black ink thus prepared is projected to exhibit a viscosity of about 11 cps at about 110 to about 140° C. as measured on an AR2000 Rheometer from TA Instruments. The ink is then filtered subsequently through a 1 μm and then a 0.45 μm glass fiber disc filter at 110° C. with an applied pressure of 15 psi. The final ink is then cooled to room temperature and printed using an ink jet printer.

Example 16

A carbon black ink is prepared as in ink Example 15 except that WB-5 dispersant is used in place of Petrolite CA-11. The composition of this ink is shown in Table 2 below.

Example 17

A carbon black ink is prepared as in ink Example 15 except that WB-17 dispersant is used in place of Petrolite CA-11. The composition of this ink is shown in Table 2 below.

Example 18

A carbon black ink is prepared as in ink Example 15 except that an additional 200 grams of Extrudate B is added to the ink after the final 30 minute homogenization step and the ink is homogenized for an additional 20 minutes. The composition of this ink is shown in Table 2 below

TABLE 1

| | Control Inks | | | | Inks of the Present Disclosure (Prophetic) | | | | |
|---|---|---|---|---|---|---|---|---|---|
| | 2 | 3 | 4 | 5 | 8 | 9 | 10 | 11 | 12 |
| Components (%) | | | | | | | | | |
| Triamide Resin | 10.12 | 10.3 | 10.26 | 10.12 | 9.28 | 9.28 | 9.28 | 8.28 | 7.73 |
| Nipex® 150 Carbon Black | 3.01 | 3.06 | 3.05 | 3.01 | 2.96 | 2.96 | 2.96 | 2.64 | 2.47 |
| Urethane Derivative Petrolite CA-11 ™ | 3.95 | 0 | 0 | 3.94 | 3.95 | 0 | 0 | 3.94 | 3.68 |
| Urethane Derivative WB-5 ™ | 0 | 2.64 | 0 | 0 | 0 | 2.87 | 0 | 0 | 0 |
| Urethane Derivative WB-17 ™ | 0 | 0 | 2.63 | 0 | 0 | 0 | 2.82 | 0 | 0 |
| Kemamide ™ S180 | 15.9 | 15.25 | 15.4 | 15.19 | 15.19 | 15.25 | 15.4 | 15.19 | 14.18 |
| KE100 ™ Resin | 10.85 | 10.89 | 11 | 10.85 | 10.85 | 10.89 | 11 | 10.85 | 10.13 |
| Naugard$^R$N445 | 0.12 | 0.12 | 0.13 | 0.12 | 0.12 | 0.12 | 0.12 | 0.12 | 0.11 |
| Polyethylene Wax | 54.26 | 55.2 | 55 | 54.24 | 54.26 | 55.2 | 55 | 54.24 | 50.63 |
| Urethane Resin | 2.5 | 2.54 | 2.53 | 2.53 | 2.5 | 2.54 | 2.53 | 2.53 | 2.36 |
| Nano Whisker A | 0 | 0 | 0 | 0 | 0.89 | 0.89 | 0.89 | 2.21 | 8.71 |
| Total Characterization | 100.71 | 100 | 100 | 100 | 100 | 100 | 100 | 100 | 100 |
| Viscosity, cPs, After Filtration @ 110° C. | 10.76 | 10.45 | 10.66 | 11.1 | 10.5 to 14 at about 110 to about 140° C. expected range latitude for jetting conditions (projected) | | | | |

TABLE 2

| Components (%) | Inks of the Present Disclosure (Prophetic) | | | |
|---|---|---|---|---|
| | 15 | 16 | 17 | 18 |
| Triamide Resin | 9.28 | 9.28 | 9.28 | 7.73 |
| Nipex ® 150 Carbon Black | 2.96 | 2.96 | 2.96 | 2.47 |
| Urethane Derivative Petrolite ™ CA-11 | 3.95 | 0 | 0 | 3.68 |
| Urethane Derivative WB-5 ™ | 0 | 2.87 | 0 | 0 |
| Urethane Derivative WB-17 ™ | 0 | 0 | 2.82 | 0 |
| Kenamide ™ S180 | 15.19 | 15.25 | 15.4 | 14.18 |
| KE100 ™ Resin | 10.85 | 10.89 | 11 | 10.13 |
| Naugard ® N445 | 0.12 | 0.12 | 0.12 | 0.11 |
| Polyethylene Wax | 54.26 | 55.2 | 55 | 50.63 |
| Urethane Resin | 2.5 | 2.54 | 2.53 | 2.36 |
| Organo-Whisker A | 0.89 | 0.89 | 0.89 | 8.71 |
| Total | 100 | 100 | 100 | 100 |
| Characterization Viscosity, cPs, After Filtration @ 110° C. | 10.5 to 13 at about 110 to about 140° C. expected range latitude for jetting conditions (projected) | | | |

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A phase change ink composition comprising:
   an ink vehicle;
   a dispersing agent;
   optionally, a colorant;
   organic fiber shaped nanowhiskers;
   wherein the organic fiber shaped nanowhiskers comprise polyethylene nanowhiskers, a polypropylene-clay nanocomposite, functionalized polyethylene nanocomposites, functionalized polyethylene nanocomposites wherein the functionalized polyethylene is a maleic anhydride grafted polyethylene and wherein the fiber shaped nanowhiskers comprise polyethylene-montmorillonite nanocomposites, polyethylene encapsulated nanowhiskers, polyethylene encapsulated nanowhiskers wherein the encapsulating polyethylene is functionalized, nanoparticles modified by surface initiated polymerization, nanoparticles modified with a self-assembled monolayer, polyethylene fibers of extended-chain crystals, rhodamine B grafted on functionalized silica surfaces, or a combination thereof;
   wherein the colorant and the organic fiber shaped nanowhiskers are substantially resistant to aggregation and settling in the ink vehicle.

2. The phase change ink composition of claim 1, wherein the colorant comprises carbon black pigment, cyan pigment, yellow pigment, magenta pigment, red pigment, blue pigment, green pigment, or a combination thereof.

3. The phase change ink composition of claim 1, wherein the colorant comprises colored organic fiber shaped nanowhiskers.

4. The phase change ink composition of claim 1, wherein the organic fiber shaped nanowhiskers have a diameter of from about 2 to about 4 nanometers and an aspect ratio of from about 20 to about 100, aspect ratio being radius to length.

5. The phase change ink composition of claim 1, wherein the organic fiber shaped nanowhiskers are present in an amount of from about 0.1% to about 35% percent by weight based upon the weight of the ink composition.

6. The phase change ink composition of claim 1, further comprising a dispersing agent of the formula

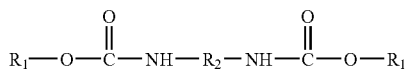

wherein $R_1$ is an alkyl group, including linear, branched, saturated, unsaturated, cyclic, unsubstituted, and substituted alkyl groups, and wherein hetero atoms, including oxygen, nitrogen, sulfur, silicon, phosphorus, and boron either may or may not be present in the alkyl group, $R_2$ is an alkylene group, including linear, branched, saturated, unsaturated, cyclic, an alkylene group including aliphatic cyclic moieties therein, unsubstituted, and substituted alkylene groups, and wherein hetero atoms, including oxygen, nitrogen, sulfur, silicon, phosphorus, and boron either may or may not be present in the alkylene group, an arylene group, including unsubstituted and substituted arylene groups, and wherein hetero atoms, including oxygen, nitrogen, sulfur, silicon, phosphorus, and boron, either may or may not be present in the arylene group, an arylalkylene group, including unsubstituted and substituted arylalkylene groups, and wherein hetero atoms, including oxygen, nitrogen, sulfur, silicon, phosphorus, and boron, either may or may not be present in either the aryl or the alkyl portion of the arylalkylene group, an alkylarylene group, including unsubstituted and substituted alkylarylene groups, and wherein hetero atoms, including oxygen, nitrogen, sulfur, silicon, phosphorus, and boron, either may or may not be present in either the alkyl or the aryl portion of the alkylarylene group.

7. The phase change ink composition of claim 1, further comprising:
   at least one curable monomer or prepolymer;
   at least one gellant;
   optionally, a reactive oligomer; and
   optionally, at least one low molecular weight photoinitiator.

8. A method for preparing the phase change ink composition of claim 1 comprising:
   combining organic fiber shaped nanowhiskers with the ink vehicle;
   wherein the organic fiber shaped nanowhiskers comprise polyethylene nanowhiskers, a polypropylene-clay nanocomposite, functionalized polyethylene nanocomposites, functionalized polyethylene nanocomposites wherein the functionalized polyethylene is a maleic anhydride grafted polyethylene and wherein the fiber shaped nanowhiskers comprise polyethylene-montmorillonite nanocomposites, polyethylene encapsulated nanowhiskers, polyethylene encapsulated nanowhiskers wherein the encapsulating polyethylene is functionalized, nanoparticles modified by surface initiated polymerization, nanoparticles modified with a self-assembled monolayer, polyethylene fibers of extended-chain crystals, rhodamine B grafted on functionalized silica surfaces, or a combination thereof;

combining the optional colorant with the ink vehicle to form a phase change ink composition wherein the optional colorant and the organic fiber shaped nanowhiskers are substantially resistant to aggregation and settling in the ink vehicle.

9. The method of claim 8, comprising adding the organic fiber shaped nanowhiskers to a resin component or components of the ink vehicle by an extrusion process prior to the addition of the other ink components and optional colorant; or adding the organic fiber shaped nanowhiskers and the optional colorant to a resin component or components of the ink vehicle by an extrusion process prior to the addition of the other ink components.

10. The method of claim 8, comprising dispersing the organic fiber shaped nanowhiskers in a solvent and transferring the organic fiber shaped nanowhiskers from the solvent phase to the ink vehicle wherein the organic fiber shaped nanowhiskers are uniformly disseminated in the ink vehicle.

* * * * *